(12) United States Patent
Grohmann et al.

(10) Patent No.: US 10,577,083 B2
(45) Date of Patent: Mar. 3, 2020

(54) METHOD OF CONTROLLING AN ARTIFICIAL FORCE FEEL GENERATING DEVICE FOR GENERATION OF AN ARTIFICIAL FEELING OF FORCE ON AN INCEPTOR OF A VEHICLE CONTROL SYSTEM

(71) Applicant: AIRBUS HELICOPTERS DEUTSCHLAND GMBH, Donauworth (DE)

(72) Inventors: Boris Grohmann, Munich (DE); Thomas Rohr, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 79 days.

(21) Appl. No.: 15/980,795

(22) Filed: May 16, 2018

(65) Prior Publication Data
US 2018/0334245 A1  Nov. 22, 2018

(30) Foreign Application Priority Data
May 18, 2017 (EP) .................................... 17400028

(51) Int. Cl.
*B64C 13/04* (2006.01)
*B64C 13/28* (2006.01)
(Continued)

(52) U.S. Cl.
CPC ............ *B64C 13/345* (2018.01); *B64C 13/04* (2013.01); *B64C 13/10* (2013.01); *B64C 13/46* (2013.01);
(Continued)

(58) Field of Classification Search
CPC ....... B64C 13/345; B64C 13/10; B64C 13/22; B64C 13/46; B64C 27/605; B64C 13/04; B64C 13/50; B64F 5/60; G05D 1/0072
(Continued)

(56) References Cited

U.S. PATENT DOCUMENTS 8,342,455 B2  1/2013  Allieta et al.
2010/0123045 A1  5/2010  Grieser
(Continued)

FOREIGN PATENT DOCUMENTS

EP  2311729 A1  4/2011
EP  2374714 A2  10/2011
(Continued)

OTHER PUBLICATIONS

European Search Report for EP 17400028, Completed by the European Patent Office, dated Dec. 1, 2017, All together 7 Pages.

*Primary Examiner* — Eduardo Colon Santana
*Assistant Examiner* — Zemenay T Truneh
(74) *Attorney, Agent, or Firm* — Brooks Kushman P.C.

(57) ABSTRACT

A method of controlling an artificial force feel generating device for generation of an artificial feeling of force on an inceptor that is adapted for controlling a servo-assisted control unit of a vehicle control system, wherein the artificial force feel generating device comprises at least one force generating device that is mechanically connected to the inceptor for generating a tactile cue force acting in operation on the inceptor, and wherein a safety device is provided for limiting authority of the at least one force generating device, the method comprising at least the steps of: monitoring usage of the safety device during operation of the artificial force feel generating device, determining a current accumulated fatigue of the safety device on the basis of the monitored usage, and re-configuring the at least one force (Continued)

generating device on the basis of the current accumulated fatigue.

15 Claims, 11 Drawing Sheets

(51) Int. Cl.
  *B64C 13/50* (2006.01)
  *B64C 13/46* (2006.01)
  *B64F 5/60* (2017.01)
  *B64C 13/10* (2006.01)
  *B64C 13/22* (2006.01)
(52) U.S. Cl.
  CPC ............... *B64C 13/50* (2013.01); *B64F 5/60* (2017.01); *B64C 13/22* (2013.01)
(58) Field of Classification Search
  USPC ........................................................ 318/565
  See application file for complete search history.

(56) References Cited

U.S. PATENT DOCUMENTS

| | | |
|---|---|---|
| 2015/0108281 A1 | 4/2015 | Antraygue |
| 2016/0096616 A1 | 4/2016 | Li et al. |
| 2016/0325830 A1* | 11/2016 | Waltner ............... G05D 1/0072 |

FOREIGN PATENT DOCUMENTS

| | | |
|---|---|---|
| EP | 2266878 B1 | 8/2012 |
| EP | 3069990 A1 | 9/2016 |
| EP | 2821873 B1 | 10/2016 |

* cited by examiner

METHOD OF CONTROLLING AN ARTIFICIAL FORCE FEEL GENERATING DEVICE FOR GENERATION OF AN ARTIFICIAL FEELING OF FORCE ON AN INCEPTOR OF A VEHICLE CONTROL SYSTEM

CROSS-REFERENCE TO RELATED APPLICATIONS

This application claims priority to European patent application No. EP 17400028.1 filed on May 18, 2017, the disclosure of which is incorporated in its entirety by reference herein.

BACKGROUND OF THE INVENTION

(1) Field of the Invention

The present invention is related to a method of controlling an artificial force feel generating device for generation of an artificial feeling of force on an inceptor of a vehicle control system.

2) Description of Related Art

Artificial force feel generating devices are used in vehicles that are controllable in a flowing medium, such as air or water, and that are provided with servo-assisted control units that are controlled by suitable associated inceptors, such as control sticks, control columns, sidesticks, pedals, steering wheels and so on. For instance, artificial force feel generating devices are used in aircrafts, such as airplanes and helicopters, or in watercrafts, such as ships, boat, hovercrafts and submarines.

By way of example, an artificial force feel generating device that is used in an aircraft is usually adapted for generating artificial breakout forces for an inceptor of a given servo-assisted control unit, such as a rudder, and additional optional artificial force gradients for convenient control of this inceptor by the pilot. The artificial breakout forces and additional optional artificial force gradients are forces that need to be overcome by the pilot when moving the inceptor from a predetermined neutral position into a respective operating position desired by the pilot.

The predetermined neutral position is a position of the inceptor that corresponds to a preferred motion direction of the aircraft and that is generally characterized in that in it no forces act on the inceptor. In other words, no forces need to be applied onto the inceptor in operation for keeping it in its neutral position.

A reel, e. g. centering and/or anchoring, feeling of the artificial breakout forces and the additional optional artificial force gradients usually becomes noticeable to the pilot of the aircraft when the inceptor passes a so-called trim point on its travel from the neutral position to the respective desired operating position. This trim point is slidable, i. e. adjustable within a defined control range by means of a trim coupling and/or a trim motor. However, in order to enable the pilot to sensitively control the aircraft, the artificial forces generated by the artificial force feel generating device, i. e. the artificial breakout forces and the additional optional artificial force gradients, should be relatively moderate.

If an automatic flight control system (AFCS) is used with the aircraft, the artificial breakout forces are usually used to support a respective input of AFCS actuator signals onto the inceptor and to move a respective mechanical linkage of associated flight control kinematics. The forces that can be applied to the inceptor and/or flight control kinematics by such an AFCS are, thus, limited by the artificial breakout forces.

Exemplary artificial force feel generating devices are e. g. described by the documents EP 2 266 878 B1, EP 2 311 729 A1 and US 2010/0123045 A1. In these exemplary artificial force feel generating devices, a force applied to a corresponding inceptor by the pilot is measured by an external force or pressure sensor for controlling the devices on the basis of the measured force.

In all of the above described conventional artificial force feel generating devices actuators, such as parallel or trim actuators, are provided that are respectively linked to associated mechanical flight control kinematics. Usually, these actuators are implemented by means of electric motors and spring units that are directly loaded by the electric motors such that they provide an associated servo-assisted control unit with a generated artificial feeling of force. For safety reasons, these actuators must be protected from mechanical jam.

The document EP2374714 describes a system that includes pilot control devices and a plurality of fly-by-wire (FBW) control units to control flight control surfaces of an airplane. Each control unit is adapted to operate independently of other control units and directly control an actuator to control a control surface as a function of direct pilot control device input. Each pilot control device will be wired with all dedicated Digital Actuator Control Unit (DACU) to provide enough redundancy and safety for the critical command path. The system provides ability to disengage an actuator if safety critical errors are detected. The system also provides smart functionality per customer specific needs which is related to some control flight control surfaces of the airplane. The system further provides local force fight capabilities that are monitored for some events, i.e. global force fight authority exceeding, local force fight resources availability loss and maximum fatigue level exceeding. When force fight authority is exceeded, the system switches to an active-standby mode. When maximum fatigue level is exceeded, the system only indicates maintenance action and sets no dispatch indication.

More specifically, the actuators must be protected such that an internal jam inside of a given actuator may not block the associated mechanical flight controls kinematics, as this could lead to loss of control of a given aircraft. Therefore, so-called "safety devices" are usually employed to disconnect upon occurrence of a mechanical jam the associated mechanical flight control kinematics from a respective interior of a given actuator.

In conventional aircrafts, various different safety devices are used, such as e. g. simple/passive shear pins, passive torque limiters, slipping clutches, active clutches, disconnect devices or others that can be activated on demand by the pilot, the AFCS, etc. An exemplary arrangement is e. g. described by the document EP 3 069 990 A1.

However, shear pins are advantageous, as they are comparatively small, lightweight, as they weigh usually only a few grams, and are easy to integrate. However, use of shear pins requires that a predetermined static load of sure rupture intended by a pilot of a given aircraft is significantly larger than normal operating loads occurring during flight of the given aircraft and for which no unintended rupture shall occur. Such normal operating loads are generally comparatively low.

More specifically, such normal operating loads include a comparatively small friction or anchoring by a classical trim, which is e. g. in the order of 5 to 10N at a predefined grip reference point (GRP) of a respective pilot stick of a given aircraft. In addition, spring gradient forces that are generated by a classical trim actuator, e. g. for a respective cyclic axis with respect to roll or pitch if the aircraft is a rotary wing aircraft, amount only in the order of maximum 20 to 30N at the GRP for full stroke in one direction.

However, if the parallel or trim actuator is used to generate tactile cue forces, such as soft stops for flight envelope protection of the given aircraft resp. the rotary wing aircraft, operating loads occurring in operation due to flight envelope protection are much higher than the above-described normal operating loads of the classical trim, as it must be assured that the pilot of the given aircraft resp. the rotary wing aircraft does not override the tactile cue forces, such as soft stops, unintendedly. In this case, tactile cue forces in the order of 60 to 100N at the GRP are usually envisaged.

In this case, however, a maximum disconnecting force that may be applied by the pilot for disconnecting the associated mechanical flight control kinematics from a jammed actuator are not much higher, for instance in the order of 150 to 180N.

It should be noted that force levels of collective levers in a rotary wing aircraft as described above are usually approximatively similar to cyclic ones, while yaw axis force levels, i. e. force levels on pedal units could be higher than the indicative force values given above for the respective cyclic axis. Nevertheless, respective ratios between different cases of usage remain nonetheless at least similar.

As a consequence, a respective factor of margin between the static load of sure rupture intended by the pilot of the given aircraft resp. the rotary wing aircraft and the tactile cue forces, such as soft stops, is generally too small to design a respective shear pin for infinite life while being subject to fatigue loads by tactile cue forces, such as soft stops. More specifically, a major problem consists in that in case of flight envelope protection by means of tactile cue forces, comparatively highest pilot control forces and corresponding loads are expected to occur when the flight envelope protection is active. Thus, a given safety device that is implemented by means of a shear pin will rupture most probably in a comparatively critical situation, in which the rupture is most critical resp. dangerous.

In order to avoid a rupture of the given safety device that is implemented by means of a shear pin in a comparatively critical situation, two different solutions can be envisaged. Firstly, another safety device such as a passive torque limiter, slipping clutch, active clutch or disconnect device with corresponding additional mass, cost and size can be used instead of the shear pin. Alternatively, usage monitoring of loads that are really occurring during life time of the parallel or trim actuator on the shear pin can be performed in order to avoid pre-mature, i. e. unexpected and critical rupture of the shear pin, which could result in sudden, unexpected loss of tactile cue forces and, thus, of flight envelope protection.

By way of example, the document EP 2 821 873 B1 describes usage monitoring based on torque measurements, which is used for determining an accumulated fatigue of a component of an aircraft. The document US 2015/0108281 A1 describes usage monitoring based on primary signals processed by sensors, which is used for detecting internal anomalies within a piloting member of an aircraft. The document US 2016/0096616 A1 describes usage monitoring based on position control servo signals, which is used for determining pilot external load disturbances.

However, none of the above-described documents describes a method of controlling an artificial force feel generating device for generation of an artificial feeling of force on an inceptor of a vehicle control system, which is based on usage monitoring. In particular, none of the above-described documents describes a method that is suitable to avoid pre-mature, i. e. unexpected and critical loss of tactile cue forces and, thus, of flight envelope protection during operation of an associated aircraft.

BRIEF SUMMARY OF THE INVENTION

It is, therefore, an object of the present invention to provide a new method of controlling an artificial force feel generating device for generation of an artificial feeling of force on an inceptor of a vehicle control system, the method being based on usage monitoring and being suitable to avoid pre-mature, i. e. unexpected and critical loss of tactile cue forces and, thus, of flight envelope protection during operation of an associated aircraft. This object is solved by a method of controlling an artificial force feel generating device for generation of an artificial feeling of force on an inceptor of a vehicle control system having the features of claim 1.

More specifically, according to the present invention a method of controlling an artificial force feel generating device for generation of an artificial feeling of force on an inceptor of a vehicle control system is provided. The inceptor is adapted for controlling a servo-assisted control unit of the vehicle control system via associated flight control kinematics. The artificial force feel generating device comprises at least one force generating device that is mechanically connected to the inceptor for generating a tactile cue force acting in operation on the inceptor, and a safety device is provided for limiting authority of the at least one force generating device. The method comprises at least the steps of:

monitoring usage of the safety device during operation of the artificial force feel generating device, determining a current accumulated fatigue of the safety device on the basis of the monitored usage, and re-configuring the at least one force generating device on the basis of the current accumulated fatigue.

Advantageously, re-configuring the at least one force generating device allows re-configuring of the artificial feeling of force on the inceptor, i. e. re-configuring a strength resp. intensity of the artificial feeling and, thus, loads that are applied to the inceptor by means of the artificial force feel generating device. Thus, undesired Aircraft-on-Ground (AoG) time can be prevented and a continuation of flight operations can be enabled, but with reduced flight envelope protection.

According to one aspect, the artificial force feel generating device allows providing the nominal force and the tactile cue force by means of two separate force generating devices that are independent from each other and arranged in parallel. Preferably, each one of the two separate force generating devices is provided with a separate safety device for respectively limiting authority of an associated one of the two separate force generating devices.

More specifically, preferentially a first safety device is provided for a respective nominal force generating device and a second safety device is provided for a respective tactile cue force generating device. Preferably, at least the tactile cue force generating device is embodied by means of a shear pin and, preferentially, each one of the first and second safety devices is embodied by means of a shear pin.

Advantageously, by using shear pins comparatively lightweight and cost efficient safety devices can be provided. Thus, additional mass, cost and size of conventional safety devices such as passive torque limiters, slipping clutches, active clutches or disconnect devices can be avoided.

Preferably, usage monitoring is performed at least for the shear pin of the tactile cue force generating device. In addition, usage monitoring may also be performed for the nominal force generating device. Advantageously, the usage monitoring shall be maximum FDAL C in order to prevent pre-mature shear pin rupture and a significant reduction of margin of safety. In other words, the usage monitoring allows to avoid pre-mature, i. e. unexpected rupture of the shear pin, so that sudden, unexpected loss of tactile cues and flight envelope protection can be prevented reliably.

According to one aspect, at least the nominal force is generated by mechanical means, such as spring units and/or friction units, so that in case of loss of electrical power supply or in case of loss of corresponding electrical motors at least an artificial feeling of the nominal force is not lost, i. e. not altered. The tactile cue force is preferably generated by motor torque of an electrical motor or a suitable actuator and summed to the nominal force due to the parallel arrangement of the two separate force generating devices, i. e. the nominal force and tactile cue force generating devices. Preferably, the motor torque of the electrical motor or a suitable actuator is physically limited so that it is always overridable by the pilot with limited overriding forces.

However, as the tactile cue force is generated by motor torque with known performance characteristics via electrical current, preferentially no external force sensor resp. mechanical force/torque sensor and no special requirements for corresponding mechanical flight control kinematics are used in the vehicle control system. Instead, preferably only sensing of electrical motor current by means of a suitable motor current sensor is performed.

According to one aspect, based on the electrical motor current that is sensed by the suitable motor current sensor, as well as based on a correspondingly determined motor torque, respective shear pin loads are determined taking into account motor torque constant tolerances, motor current sensor accuracy, variations of gearbox friction and bearing friction/damping due to wear, lubrication, and environment factors, such as e. g. temperature variations. Preferentially, also inertia effects, i. e. a respective contribution resulting from motor accelerations, is considered, which is derived from position sensor measurements, preferably by means of signals provided by a motor position sensor if accurate enough, otherwise by means of an output shaft position sensor. However, it should be noted that the determination of the respective shear pin loads based on the electrical motor current is only possible if there is no irreversible transmission, such as e. g. a worm screw or a trapezoidal screw, between the electrical motor and the shear pin.

Based on a determined maximum-minimum shear pin load as well as an established maximum count of operating cycles, a fatigue damage accumulation, i. e. a current accumulated fatigue is calculated considering material properties of the shear pin. Based on the calculated current accumulated fatigue:

the respective one of the two force generating devices is re-configured and a corresponding configuration status is communicated to an AFCS and a vehicle management system (VMS) of the vehicle control system, if required in order to avoid pre-mature rupture of the shear pin, i. e. when a minimum acceptable safety margin of current accumulated fatigue is reached, a current usage status of the shear pin is communicated to the VMS, and/or a trend for the health status at the end of the current and next overhaul interval of the artificial force feel generating device is calculated based on the monitored usage as well as currently accumulated fatigue and communicated to the VMS for scheduling of required maintenance actions.

Preferably, re-configuration of the respective one of the two force generating devices includes:

reduction of maximum actuator torque, i. e. a maximum plateau of pilot override at top of tactile cue forces, change of characteristics of individual tactile cue features, e. g. reduction of gradient, and/or complete de-activation of individual and/or entire features, such as e. g. soft stop, ramp, detent, gate, etc.

According to one aspect, based on the configuration resp. re-configuration of the respective one of the two force generating devices, the AFCS:

configures available and/or unavailable protections, such as flight envelope protections, on different flight control axes, and/or commands respective force feel characteristics accordingly.

Preferably, a multi-functional display (MFD) of the vehicle control system displays for information of pilot and co-pilot of the aircraft:

a current status of the one of the two force generating devices (→normal vs. degradation) and a current configuration of its force feel characteristics, and/or the currently available and/or unavailable protections, such as flight envelope protections.

Advantageously, the artificial force feel generating device is easy to retrofit to an existing vehicle fleet since, in contrast to the conventional artificial force feel generating devices described above, no external force or pressure sensors with specific kinematics arrangements are required. Furthermore, the artificial force feel generating device with the nominal force and tactile cue force generating devices allows a limitation or reduction of structural loads, which leads to a reduction of mass of structure of the vehicle.

According to one aspect, the step of determining the current accumulated fatigue of the safety device is performed on the basis of a Wöhler diagram established for the safety unit.

According to a preferred embodiment, the step of re-configuring the at least one force generating device on the basis of the current accumulated fatigue comprises reducing a maximum tactile cue force that is applicable by the at least one force generating device in operation on the inceptor.

According to a further preferred embodiment, the method further comprises the step of determining, at least on the basis of the monitored usage and/or the current accumulated fatigue, a fatigue prediction for the safety device.

According to a further preferred embodiment, the method further comprises the step of determining, on the basis of the monitored usage and/or the determined fatigue prediction, an applicable overhaul interval of the safety device.

According to a further preferred embodiment, the at least one force generating device is mechanically connected to the inceptor via an output shaft and comprises a motor unit that is adapted for creating torque on the output shaft, the torque defining the tactile cue force acting in operation on the inceptor. The step of monitoring usage of the safety device during operation of the artificial force feel generating device comprises monitoring the torque created by the motor unit.

According to a further preferred embodiment, the at least one force generating device comprises at least one sensor element associated with the motor unit. The step of monitoring usage of the safety device during operation of the artificial force feel generating device comprises using the at least one sensor element for detecting an operating parameter of the motor unit, and determining the torque created by the motor unit on the basis of the detected operating parameter.

According to a further preferred embodiment, the at least one sensor element comprises a motor current sensor, and the detected operating parameter is a motor current of the motor unit.

According to one aspect, an effective current for all respective motor phases of the motor unit can be detected for determination of the motor current. Alternatively, individual electrical currents for each motor phase can be detected for determination of the motor current.

According to a further preferred embodiment, the step of re-configuring the at least one force generating device on the basis of the current accumulated fatigue comprises decreasing the motor current for reducing the torque created by the motor unit.

According to a further preferred embodiment, the safety device comprises a shear pin, and the step of re-configuring the at least one force generating device on the basis of the current accumulated fatigue comprises reducing a maximum tactile cue force that is applicable by the at least one force generating device in operation on the inceptor such that a premature fatigue rupture of the shear pin is prevented.

According to a further preferred embodiment, the step of monitoring usage of the safety device during operation of the artificial force feel generating device comprises determining shear pin loads acting on the shear pin during operation of the artificial force feel generating device.

According to a further preferred embodiment, the at least one force generating device is mechanically connected to the inceptor via an output shaft and comprises a motor unit and a reversible gear unit that is operated by the motor unit. The motor unit is adapted for creating torque on the output shaft. The torque defines the tactile cue force acting in operation on the inceptor, and determining shear pin loads acting on the shear pin comprises:

determining the torque created by the motor unit, motor speed and/or motor accelerations of the motor unit occurring during operation of the artificial force feel generating device, determining inertia forces and/or friction/damping forces of the motor unit occurring during operation of the artificial force feel generating device, and determining inertia forces and/or friction forces of the reversible gear unit occurring during operation of the artificial force feel generating device.

According to a further preferred embodiment, the method further comprises the step of monitoring health of the safety device during operation of the artificial force feel generating device, wherein the step of re-configuring the at least one force generating device is based on the monitored health of the safety device.

According to a further preferred embodiment, the method further comprises the steps of determining, at least on the basis of a trend of a current monitored health of the safety device, a health prediction for the safety device, and determining, on the basis of the determined health prediction, an applicable overhaul interval of the safety device.

According to a further preferred embodiment, the safety device comprises a shear pin and the step of monitoring health of the safety device during operation of the artificial force feel generating device comprises determining backlash of the shear pin based on motor position sensor and tactile cue trim rotary output position sensor taking into account motor torque estimated based on motor current sensor, drive train and support compliance, gearbox wear, bearing and support wear.

The present invention further provides a method of controlling an artificial force feel generating device for generation of an artificial feeling of force on an inceptor of a vehicle control system that comprises an automatic flight control system, the inceptor being adapted for controlling a servo-assisted control unit of the vehicle control system via associated flight control kinematics, wherein the artificial force feel generating device comprises at least one force generating device that is mechanically connected to the inceptor via a mechanical connection for generating a tactile cue force acting in operation on the inceptor. The method comprises at least the steps of:

monitoring usage of the inceptor and the mechanical connection during operation of the artificial force feel generating device, determining a current accumulated fatigue of the inceptor and/or the mechanical connection on the basis of the monitored usage, determining a fatigue prediction for the inceptor and/or the mechanical connection on the basis of the current accumulated fatigue, re-configuring protections of the automatic flight control system on the basis of the current accumulated fatigue, re-configuring the at least one force generating device on the basis of the current accumulated fatigue, and determining an applicable overhaul interval of the inceptor and the mechanical connection on the basis of the determined fatigue prediction.

According to one aspect, fatigue of the inceptor and/or the mechanical connection of a respective tactile cue force generating device can also be monitored. In fact, the mechanical connection that may include control rods, levers, bellcranks, stick and/or pedal assembly, bearings, supports by a respective aircraft structure between the artificial force feel generating device and a corresponding grip and/or pedals, where a pilot of a given aircraft inputs control forces, is also subject to fatigue loads due to the pilot control force inputs corresponding to the output forces/torques generated by the artificial force feel generating device.

Advantageously, usage monitoring and fatigue load estimation can also be performed with respect to the inceptor and the mechanical connection. In this case, corresponding monitor and trending tasks are preferably executed by the VMS based on determined loads and control positions in order to calculate tactile cue fatigue load cycles.

According to one aspect, an additional position sensor is used for measuring a current spring position of a nominal force generating device (gradient trim only) in order to determine not only fatigue loads based on tactile cue forces, but also based on nominal law.

Preferably, based on a currently sensed position of an output shaft of the tactile cue force generating device, which preferably comprises a shear pin as safety device, and a sensed position of a respective motor associated with the tactile cue force generating device, a current backlash is determined by taking into account:

variations of gearbox and bearing backlash due to environmental parameters, such as e. g. temperature variations, and wear of the shear pin, which may be an indicator for rupture of the shear pin in a near future.

According to one aspect, compliance of the drive train, such as gearboxes, shafts and bearings, as well as supports is also contained in a respective difference measured between the position sensors.

Rupture of the shear pin is advantageously detected in a similar manner. More specifically, an "excessive backlash" corresponds to a loss of correlation between a used motor position sensor and a determined position of the output shaft of the tactile cue force generating device. Thus, in case of such an excessive backlash, the tactile cue force generating device is preferably reconfigured, the AFCS and/or VMS are notified of the detected "excessive backlash" and the pilot is informed by visual cue via the multi-functional display or other means, e. g. an aural cue like acoustic alert/alarm.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
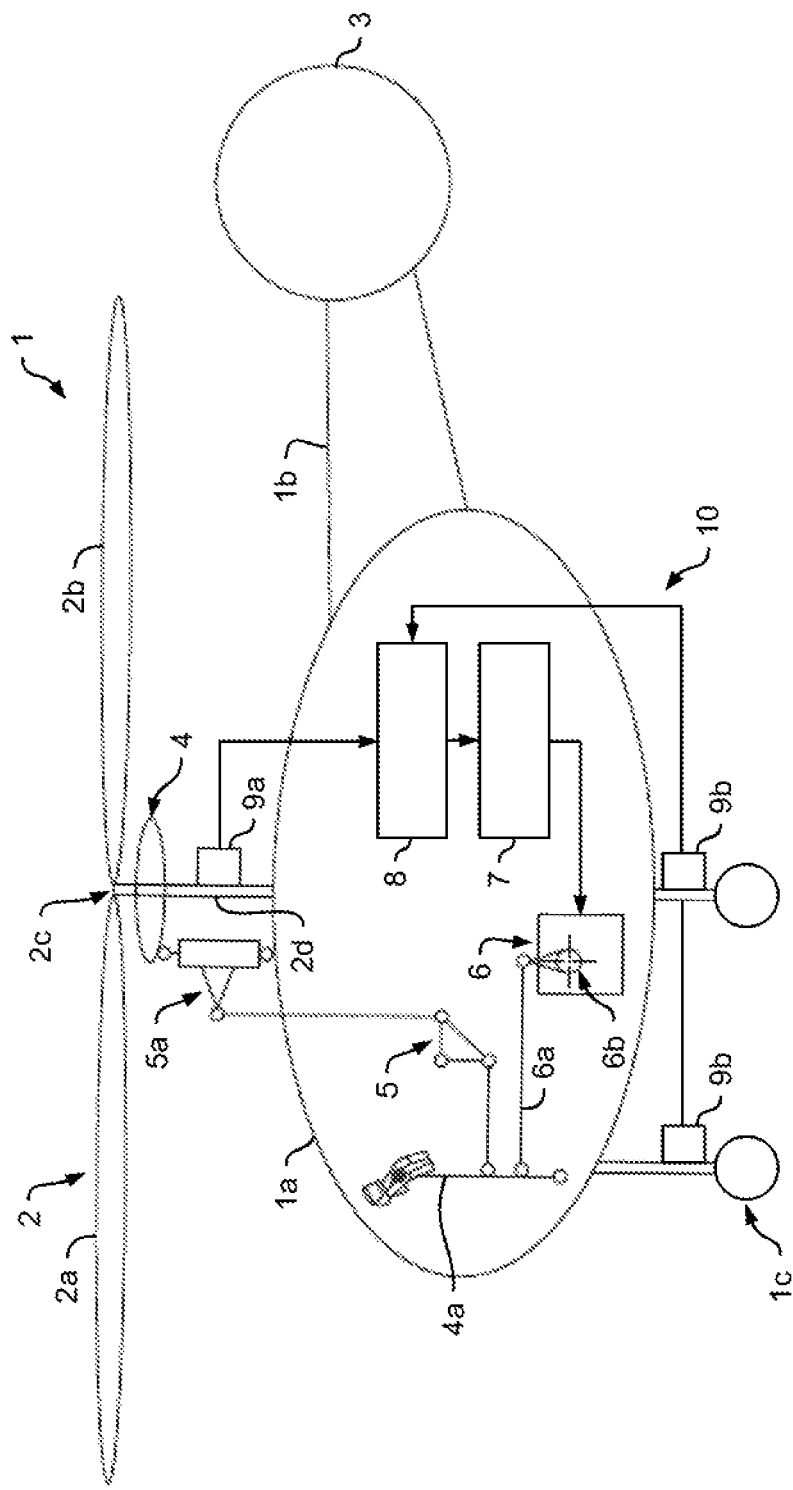
FIG. 1 shows a schematic view of a vehicle with a control system that comprises an artificial force feel generating device according to the present invention.

FIG. 1 shows a vehicle 1 that is exemplarily illustrated as an aircraft, in particular as a rotary wing aircraft and, more particularly, as a helicopter. Thus, for purposes of simplicity and clarity, the vehicle 1 is hereinafter referred to as the "helicopter" 1. It should, however, be noted that the present invention is not limited to helicopters and can likewise be applied to any other vehicle, in particular to a vehicle that is controllable in a flowing medium, such as air or water, independent of a particular configuration thereof.

Illustratively, the helicopter 1 comprises a fuselage 1a that defines a tail boom 1b and that is connected to a landing gear 1c, which is embodied as a wheel-type landing gear by way of example. The helicopter 1 preferably further comprises at least one main rotor 2 for providing lift and forward, backward or sideward thrust during operation. The main rotor 2 is exemplarily embodied as a multi-blade main rotor that comprises a plurality of rotor blades 2a, 2b that are mounted at an associated rotor head 2c to a rotor mast 2d, which rotates in operation of the helicopter 1 around an associated rotor axis defined by the rotor mast 2d.

By way of example, the helicopter 1 further comprises at least one preferentially shrouded counter-torque device 3 configured to provide counter-torque during operation, i. e. to counter the torque created by rotation of the at least one multi-blade main rotor 2 for purposes of balancing the helicopter 1 in terms of yaw. The at least one counter-torque device 3 is illustratively implemented by a tail rotor at an aft section of the tail boom 1b, and therefore also referred to as the "tail rotor" 3 hereinafter.

According to one aspect, the helicopter 1 comprises at least one pitch control unit 4 for controlling collective and/or cyclic pitch of the rotor blades 2a, 2b of the at least one multi-blade main rotor 2 in operation. This pitch control unit 4 is preferentially arranged between the rotor head 2c and the fuselage 1a of the helicopter 1 and preferably implemented by means of a swash plate assembly.

It should be noted that a suitable swash plate assembly that can be used for realizing the pitch control unit 4 and its functionality is well-known to the person skilled in the art. Therefore, a detailed description of the pitch control unit 4, i. e. the swash plat assembly, is omitted for brevity and conciseness.

It should further be noted that a similar pitch control unit is well-known for collective pitch control of respective rotor blades of the tail rotor 3. Therefore, each and every embodiment that is explained in detail hereinafter with respect to the at least one multi-blade main rotor 2 can likewise be applied with respect to the tail rotor 3.

Preferably, the pitch control unit 4 is servo-assisted by an associated servo drive unit 5a, such as a hydraulic power unit, which is controlled by means of an inceptor 4a via an associated mechanical linkage 5 that defines respective flight control kinematics of the helicopter 1. It should be noted that for purposes of simplicity and clarity of the drawings only a single channel related to pitch control of the helicopter 1 is shown with respect to the associated servo drive unit 5a and the mechanical linkage 5. However, generally three channels are provided, i. e. the channel related to longitudinal pitch control and another channel related to roll control via the inceptor 4a and the third channel for collective control via another suitable inceptor of the helicopter 1.

It should be noted that a similar arrangement for yaw control of the helicopter 1 via the tail rotor 3 and suitable pedals as pilot interface is also well-known. Therefore, each and every embodiment that is explained in detail hereinafter with respect to the at least one multi-blade main rotor 2 can likewise be applied with respect to the tail rotor 3.

The inceptor 4a is illustratively embodied as a cyclic stick that is supposed to be provided for controlling the cyclic pitch of the rotor blades 2a, 2b only, while the collective pitch is supposed to be controlled by a separate inceptor. Therefore, the inceptor 4a is also referred to as the "cyclic stick" 4a hereinafter, for simplicity and clarity.

The mechanical linkage 5 comprises e. g. push/pull control rods, bellcranks, torsion shafts and/or a flexball assembly and is well-known to the person skilled in the art. Therefore, a detailed description of the mechanical linkage 5 is omitted for brevity and conciseness.

According to one aspect, the cyclic stick 4a is connected to, and as such part of, a vehicle control system 10 that comprises an artificial force feel generating device 6 for generation of an artificial feeling of force on the cyclic stick 4a. More specifically, the latter is preferably connected via a mechanical connection 6a to an output unit 6b of the artificial force feel generating device 6, which is also part of the vehicle control system 10. Preferentially, the output unit 6b is implemented as a rotary output actuator and, therefore, also referred to hereinafter as the "rotary output actuator 6b", for clarity and simplicity.

Preferably, the artificial force feel generating device 6 is controlled by an AFCS 7. More specifically, the AFCS 7 provides commands for the artificial force feel generating device 6 including a respective configuration of tactile cues that are implemented by the artificial force feel generating device 6. In cases where the artificial force feel generating device 6 is used with a vehicle other than the helicopter 1, the AFCS 7 more generally implements an automatic motion control system of that vehicle.

According to one aspect, the AFCS 7 is connected to a VMS 8, both of which are part of the vehicle control system 10. The VMS 8 is preferably adapted for providing predictors for the limits of the performance and flight domain of the helicopter 1 as well as for providing corresponding tactile cues, and is electrically connected to one or more sensors by means of suitable interfaces, for controlling the AFCS 7 on the basis of sensor information received from these sensors in operation of the helicopter 1, or for providing the sensor information to the AFCS 7 in operation. The latter allows the AFCS 7 to control the artificial force feel generating device 6 on the basis of the provided sensor information.

Preferably, the sensors comprise at least one rotor mast bending moment sensor 9a associated with the rotor mast 2d, such as one or more strain gauges and/or optical sensors, which may be redundant in order to increase availability and reliability. The sensors illustratively further comprise at least one weight-on-wheels sensor 9b associated with the exemplary wheel-type landing gear 1c.

More specifically, sensor information provided by the at least one rotor mast bending moment sensor 9a can be analyzed by the VMS 8 for implementing a required limitation of a mast bending moment occurring in operation of the helicopter 1 and an adequate limitation of cyclic control deflections in flight or centering of the cyclic stick 4a in an on-ground condition of the helicopter 1. This sensor information can further be analyzed to determine two-dimensional information indicating current pitch and roll of the helicopter 1 based on knowledge of a current rotor angular position in operation.

It should be noted that the cyclic stick 4a is only illustrated and described in more detail by way of example and not for limiting the invention accordingly. Instead, other inceptors such as e. g. pedals that are provided for controlling the tail rotor 3 via an associated mechanical linkage and an associated servo drive unit, such as a hydraulic power unit, for controlling the yaw of the helicopter 1, are also contemplated. However, while it is clear to the person skilled in the art that such other inceptors are also present in a helicopter, they are not shown in the helicopter 1 in FIG. 1, as they are not required for illustration and understanding of the functionality of the vehicle control system 10. However, it should be clear that the helicopter 1 of FIG. 1 likewise comprises these other inceptors and that the artificial force feel generating device 6 is, consequently, also configured for generation of an artificial feeling of force on these other inceptors.

Figure 2:
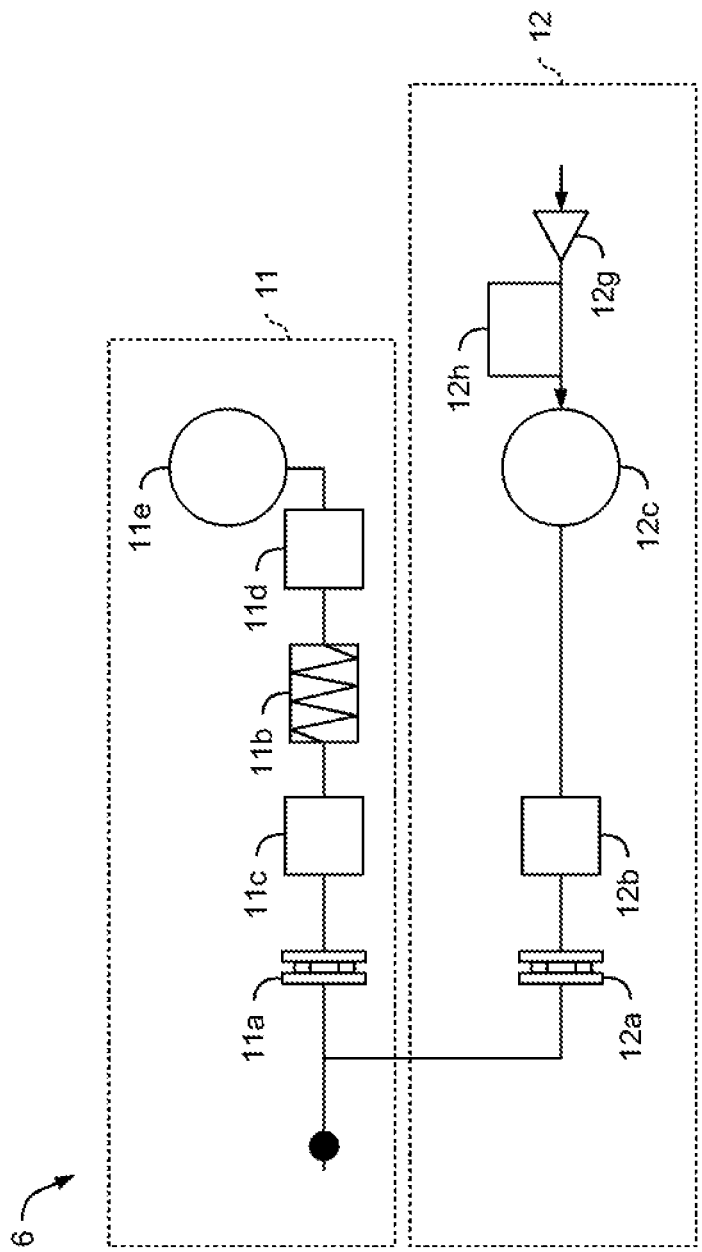
FIG. 2 shows a block diagram of the artificial force feel generating device of FIG. 1 according to an embodiment.

FIG. 2 shows the artificial force feel generating device 6 of FIG. 1 with at least one first force generating device 11 and at least one second force generating device 12, both of which are mechanically connected to the rotary output actuator 6b of the artificial force feel generating device 6. The first force generating device 11 is preferably provided for generating a nominal force acting in operation on the cyclic stick 4a of FIG. 1 and the second force generating device 12 is preferably provided for generating a tactile cue force acting in operation on the cyclic stick 4a of FIG. 1. Thus, the first force generating device 11 can also be referred to as a "nominal force generating device" and the second force generating device 12 can also be referred to as a "tactile cue force generating device". The tactile cue force is preferentially limited for being overridable by a pilot who operates the cyclic stick 4a of FIG. 1 in operation of the helicopter 1.

According to one aspect, the first and second force generating devices 11, 12 are arranged in parallel. Preferably, the first force generating device 11 is connected to the rotary output actuator 6b of the artificial force feel generating device 6 via a first safety device 11a that is at least provided for limiting authority of the first force generating device 11. The second force generating device 12 is connected to the rotary output actuator 6b of the artificial force feel generating device 6 via a second safety device 12a that is at least provided for limiting authority of the second force generating device 12. In particular, internal failures or malfunctions such as jamming can preferably be prevented by means of these first and second safety devices 11a, 12a. According to one aspect, at least the second safety device 12a is embodied by a shear pin and, therefore, hereinafter also referred to as the "shear pin 12a", for simplicity and clarity. Preferably, the first safety device 11a is also embodied by a shear pin.

The safety unit 11a is preferably provided for disconnecting the first force generating device 11 from the cyclic stick 4a of FIG. 1, if required. The safety unit 12a is preferably provided for disconnecting the second force generating device 12 from the cyclic stick 4a of FIG. 1, if required.

In one embodiment, the first force generating device 11 is implemented as a conventional trim actuator for generating the nominal force, which is well-known to the person skilled in the art. Therefore, the first force generating device 11 is also referred to as the "nominal force feel trim actuator" 11 hereinafter, for simplicity and clarity.

It should be noted that it is well-known to the person skilled in the art that different flight control axes require different nominal force feel. In one preferred embodiment, the first force generating device 11 for the yaw axis and/or collective axis provides dry friction nominal force.

Furthermore, the second force generating device 12 is implemented according to this embodiment as a tactile cue actuator for generating the tactile cue force and, consequently, hereinafter also referred to as the "tactile cue actuator" 12, for simplicity and clarity.

The nominal force preferably acts in operation on the cyclic stick 4a of FIG. 1 for moving the latter into a neutral position. This neutral position defines a trim point that determines a preferred motion direction of the helicopter 1 of FIG. 1.

Preferably, the nominal force feel trim actuator 11 comprises at least one mechanical force generating unit 11b. The latter is preferably embodied as a spring unit that provides a respective spring force, which defines the nominal force provided by the nominal force feel trim actuator 11. The respective spring force is applied from the spring unit 11b via a reversible gear unit 11c to the safety device 11a, and from the safety device 11a to the output unit 6b. The spring unit 11b is preferably further connected via an irreversible gear unit 11d to an electrical motor 11e, which is preferentially embodied as a brushed DC motor and at least provided for actuating the irreversible gear unit 11d in operation. It should be noted that, due to the irreversible gear unit 11d, provision of the nominal force by the spring unit 11b is maintained even if a loss of electrical power supply or of the brushed DC motor 11e occurs in operation.

Illustratively, the safety unit 11a, the reversible gear unit 11c, the spring unit 11b, the irreversible gear unit 11d and the brushed DC motor 11e define the nominal force feel trim actuator 11.

According to one aspect, the tactile cue actuator 12 comprises at least one electrical force generating unit 12c, which is preferably embodied as an electrical motor, in particular a brushless DC motor. This brushless DC motor 12c generates the tactile cue force that is provided by the tactile cue actuator 12 to the cyclic stick 4a of FIG. 1, preferably by means of a reversible gear unit 12b via the shear pin 12a.

Preferably, at least one sensor element 12h is associated with the brushless DC motor 12c. The at least one sensor element 12h is provided for detecting an operating parameter of the brushless DC motor 12c in operation. Preferably, the at least one sensor element 12h comprises a motor current sensor and the operating parameter is a motor current of the brushless DC motor 12c. In other words, the at least one sensor element 12h preferentially provides electrical current information for torque control. Furthermore, the at least one sensor element 12h preferably also provides rotary position information for commutation and torque control. Moreover, the at least one sensor element 12h preferably also provides information about the temperature of the brushless DC motor 12c, especially the temperature of corresponding motor windings.

According to one aspect, the brushless DC motor 12c is controlled via power electronics 12g that include preferably at least an oscillations damping unit for damping pilot-assisted oscillations and/or pilot-induced oscillations. The power electronics 12g may further comprise a pulse width modulator for controlling the brushless DC motor 12c via a suitable pulse width modulated control signal.

Illustratively, the shear pin 12a, the reversible gear unit 12b, the brushless DC motor 12c, the at least one sensor element 12h and the power electronics 12g define the tactile cue actuator 12.

Figure 3:
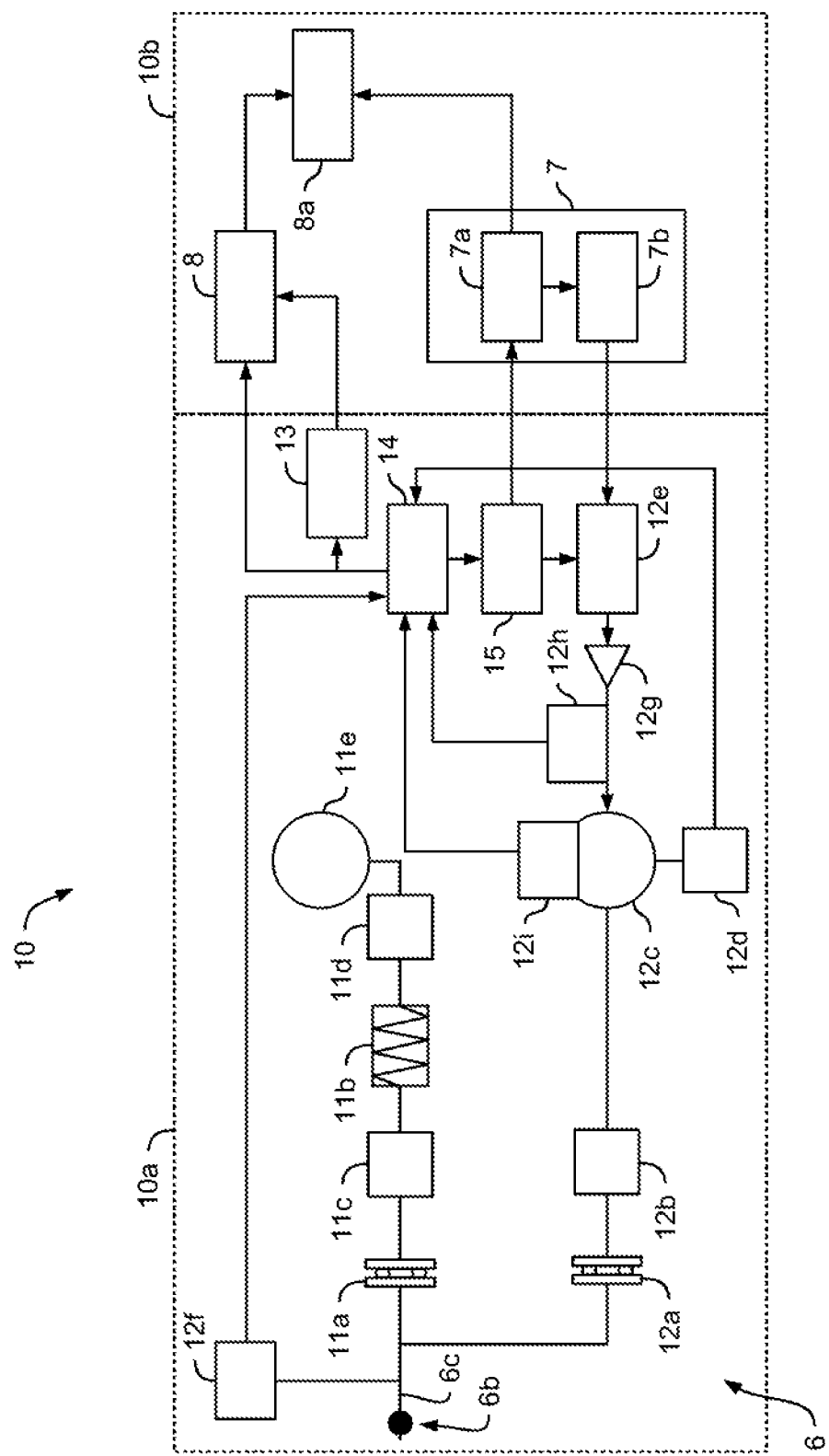
FIG. 3 shows a block diagram of the control system of FIG. 1 according to a first embodiment.

FIG. 3 shows the vehicle control system 10 of FIG. 1 with the artificial force feel generating device 6 of FIG. 2. Illustratively, the vehicle control system 10 is built up by an actuator-sided control system 10a and a vehicle-sided control system 10b. However, it should be noted that the artificial force feel generating device 6 of FIG. 2 is merely illustrated by means of its constituent components, while their allocation to the nominal force feel trim actuator 11 and the tactile cue actuator 12 of FIG. 2 is omitted, for simplicity and clarity of the drawings.

Illustratively, the tactile cue actuator 12 of FIG. 2 is mechanically connected to the cyclic stick 4a of FIG. 1 by means of the rotary output actuator 6b via an output shaft 6c.

The brushless DC motor 12c is preferably adapted for creating torque on the output shaft 6c. This torque defines a tactile cue force acting in operation on the cyclic stick 4a of FIG. 1 and can be monitored in the context of a usage monitoring of the shear pin 12a during operation of the artificial force feel generating device 6. By way of example, the at least one sensor element 12h may be used for detecting an operating parameter of the brushes DC motor 12c, such that the torque created by the brushless DC motor 12c can be determined on the basis of the detected operating parameter.

In FIG. 3, the at least one sensor element 12h is preferably embodied as a motor current sensor that is provided for detecting a motor current of the brushless DC motor 12c. In addition, preferably a motor position sensor 12d is associated with the brushless DC motor 12c for providing rotary position information with respect to a rotary motor position and a motor temperature sensor 12i is associated with the brushless DC motor 12c for providing information about the motor temperature of the brushless DC motor 12c, especially the temperature of corresponding motor windings of the brushless DC motor 12c. Moreover, preferably a position sensor 12f is associated with the artificial force feel generating device 6 and connected to the rotary output actuator 6b and, more specifically, to the output shaft 6c of the artificial force feel generating device 6. This position sensor 12f is preferentially provided for monitoring a rotational position of the rotary output actuator 6b resp. the output shaft 6c in operation.

In contrast to FIG. 2, a control and monitoring unit 12e is now provided according to one aspect for controlling the brushless DC motor 12c via the power electronics 12g. Preferably, the power electronics 12g generate a suitable pulse width modulated control signal for controlling the brushless DC motor 12c in response to instructions received from the control and monitoring unit 12e that generates these instructions on the basis of sensor information provided by the motor current sensor 12h, the motor position sensor 12d and/or the motor temperature sensor 12i.

According to one aspect, respectively detected sensor signals with respect to the brushless DC motor 12c, i. e. a current motor current detected by means of the motor current sensor 12h, a current rotary motor position detected by means of the motor position sensor 12d and a current motor temperature detected by means of the motor temperature sensor 12i, and/or a current rotational position of the rotary output actuator 6b resp. the output shaft 6c detected by means of the position sensor 12f are provided to a usage monitor 14. The usage monitor 14 is at least provided for monitoring usage of the shear pin 12a of the tactile cue actuator 12 of FIG. 2 during operation of the artificial force feel generating device 6.

Monitoring usage of the shear pin 12a during operation of the artificial force feel generating device 6 preferably comprises determining shear pin loads acting on the shear pin 12a during operation of the artificial force feel generating device 6. Monitoring usage of the shear pin 12a during operation of the artificial force feel generating device 6 may alternatively, or in addition, comprise monitoring backlash of the shear pin 12a.

As described above with reference to FIG. 2, the brushless DC motor 12c operates the reversible gear unit 12b for creating torque on the output shaft 6c. The created torque defines a respective tactile cue force acting in operation on the cyclic stick 4a of FIG. 1. Accordingly, determining shear pin loads acting on the shear pin 12a preferably comprises determining the torque created by the brushless DC motor 12c and/or motor accelerations of the brushless DC motor 12c occurring during operation of the artificial force feel generating device 6, determining inertia forces and/or friction/damping forces of the brushless DC motor 12c occurring during operation of the artificial force feel generating device 6, and/or determining inertia forces and/or friction/damping forces of the reversible gear unit 12b occurring during operation of the artificial force feel generating device 6.

Preferably, the usage monitor 14 determines a current accumulated fatigue of the shear pin 12a on the basis of the monitored usage. Preferentially, the usage monitor 14 determines the current accumulated fatigue of the shear pin 12a on the basis of the detected sensor signals and provides the determined current accumulated fatigue to a predictor 13, a force feel configurator 15 and the VMS 8. More generally, the current accumulated fatigue is preferably based on a determined maximum-minimum shear pin load as well as an established maximum count of operating cycles of the shear pin 12a, and preferentially also considers material properties of the shear pin 12a.

It should be noted that the calculation of accumulated fatigue based on the observed maximum-minimum and/or mean-amplitude loads, associated count of operating/load cycles and taking into consideration material properties is well-known to the person skilled in the art. Therefore, a detailed description of the calculation in order to obtain the accumulated fatigue is omitted for brevity and conciseness.

The predictor 13 determines preferably, at least on the basis of the monitored usage and current accumulated fatigue, a fatigue prediction for the safety device. This fatigue prediction resp. a current usage status of the shear pin 12a is communicated from the predictor 13 to the VMS 8. More specifically, a trend for the health status at the end of the current and next overhaul interval of the artificial force feel generating device 6 is preferably determined by the predictor 13 and communicated to the VMS 8 for scheduling of required maintenance actions.

The VMS 8 preferably determines, on the basis of the determined fatigue prediction, an applicable overhaul interval of the shear pin 12a. The latter is preferentially transmitted to and displayed at a MFD 8a for information of a pilot and/or co-pilot of the helicopter 1 of FIG. 1.

The force feel configurator 15 preferably re-configures, based on the current accumulated fatigue, the tactile cue actuator 12 of FIG. 2, at least if required for avoiding pre-mature rupture of the shear pin 12a, preferentially at least when a minimum acceptable safety margin of current accumulated fatigue is reached. More specifically, the force feel configurator 15 preferably instructs the control and monitoring unit 12e to control the brushless DC motor 12c via the power electronics 12g accordingly, and similarly reports to a protection configurator 7a of the AFCS 7. In other words, a current configuration status of the tactile cue actuator 12 of FIG. 2 is communicated to the AFCS 7 and, preferably, also to the VMS 8.

According to one aspect, the force feel configurator 15 re-configures, based on the currently observed temperature of the brushless DC motor 12c that is detected by means of the motor temperature sensor 12i, the tactile cue actuator 12 of FIG. 2, at least if required for avoiding overheating or, in the worst case, destruction of the brushless DC motor 12c. Furthermore, according to one aspect, the force feel configurator 15 re-configures, based on the currently observed temperature of the power electronics 12g, the tactile cue actuator 12 of FIG. 2, at least if required for avoiding overheating or, in the worst case, destruction of the power electronics 12g.

By way of example, re-configuring the tactile cue actuator 12 of FIG. 2 on the basis of the current accumulated fatigue may comprise decreasing the motor current of the brushless DC motor 12c for reducing the torque created by the brushless DC motor 12c. Alternatively, or in addition, re-configuring the tactile cue actuator 12 of FIG. 2 on the basis of the current accumulated fatigue may comprise reducing a maximum tactile cue force that is applicable by the tactile cue actuator 12 of FIG. 2 in operation on the inceptor 4a of FIG. 1 such that a pre-mature fatigue rupture of the shear pin 12a is prevented.

Figure 5:
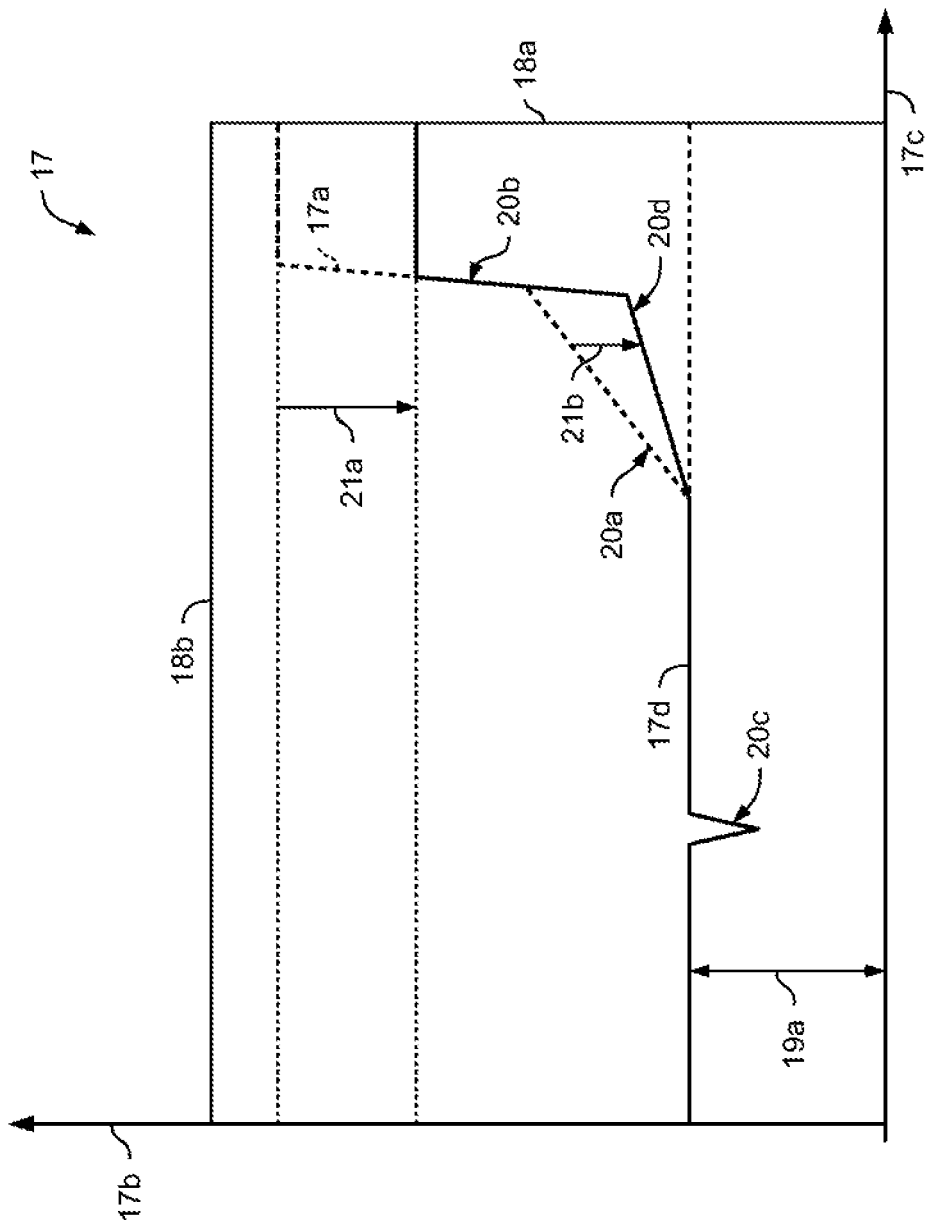
FIG. 5 shows an exemplary deflection-torque diagram in operation of the control system of FIG. 1.

More generally, re-configuration of the tactile cue actuator 12 of FIG. 2 by means of the force feel configurator 15 preferably includes:
reduction of maximum actuator torque, i. e. a maximum plateau of pilot override at top of tactile cue forces,
change of characteristics of individual tactile cue features, e. g. reduction of nominal force feel, and/or
complete de-activation of individual and/or entire features, such as e. g. soft stop, ramp, detent, gate, etc., as described in more detail below with reference to FIG. 5.

Preferably, the protection configurator 7a determines, whether re-configuration of the tactile cue actuator 12 by means of the AFCS 7 is required for flight envelope protection and, if so, instructs an associated command unit 7b of the AFCS 7 accordingly. The command unit 7b then preferably re-configures the tactile cue actuator 12 of FIG. 2, if required for flight envelope protection. In other words, the command unit 7b instructs the control and monitoring unit 12e to control the brushless DC motor 12c via the power electronics 12g accordingly. However, the protection configurator 7a may also be adapted to configure available and/or unavailable protections, such as flight envelope protections, on different flight control axes. Respective re-configuration data is then preferentially transmitted to and displayed at the MFD 8a for information of a pilot and/or co-pilot of the helicopter 1 of FIG. 1.

As a result, the MFD 8a preferably displays for information of pilot and co-pilot of the helicopter 1 of FIG. 1:
a current status of the tactile cue actuator 12 of FIG. 2 (→normal vs. degradation) and a current configuration of respectively underlying force feel characteristics, and/or
currently available and/or unavailable protections of the helicopter 1 of FIG. 1, such as flight envelope protections.

Illustratively, the MFD 8a, the AFCS 7 and the VMS 8 are associated with the vehicle-sided control system 10b. All other components are illustratively associated with the actuator-sided control system 10a.

Figure 4:
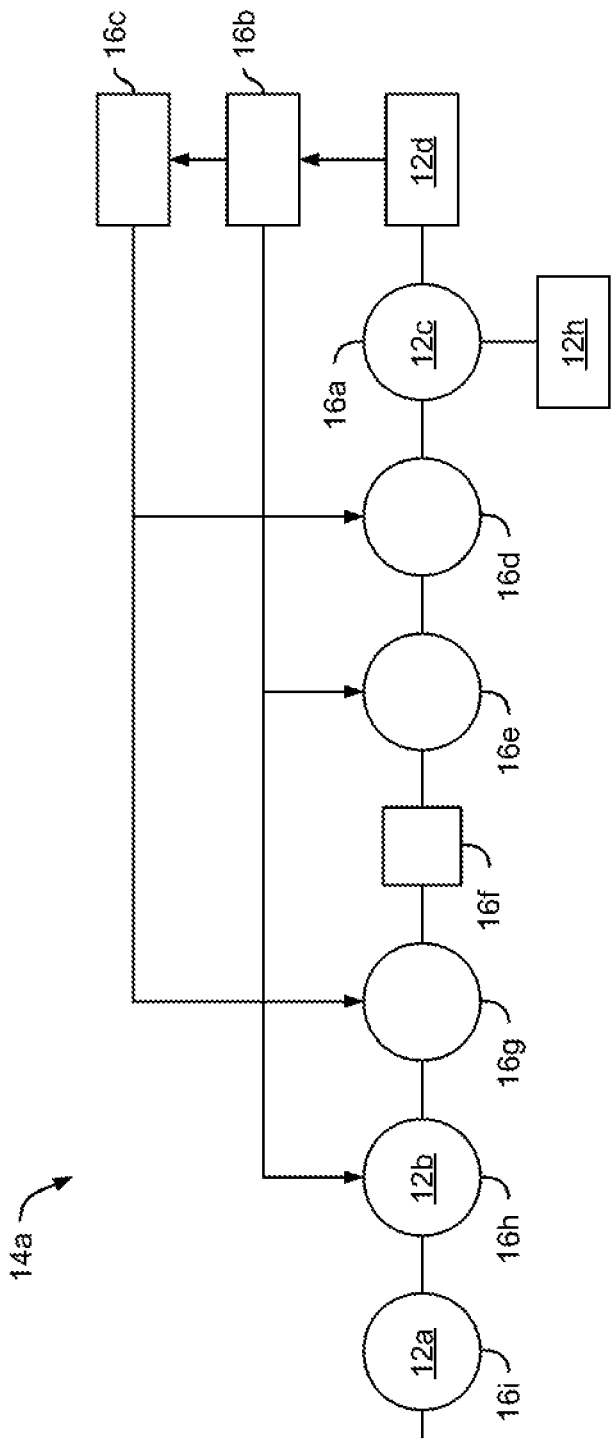
FIG. 4 shows a schematic view of a usage monitoring and fatigue loads estimation procedure according to a first embodiment.

FIG. 4 shows a usage monitoring and fatigue loads estimation procedure 14a executed by the usage monitor 14 of FIG. 3 for determining a current accumulated fatigue of the shear pin 12a of FIG. 3 according to one aspect. More specifically, all components that must be considered when determining the current accumulated fatigue of the shear pin 12a and that contribute to usage of the shear pin 12a are illustrated in FIG. 4.

As described above, the usage monitor 14 preferably determines shear pin loads 16i acting on the shear pin 12a during operation of the artificial force feel generating device 6 of FIG. 3 for determining the current accumulated fatigue. This is, according to one aspect, at least performed on the basis of the detected sensor signals received from the motor current sensor 12h, as well as on the basis of a corresponding torque created by the brushless DC motor 12c, which is determined by a suitable motor torque determination unit 16a.

Furthermore, a current speed of the brushless DC motor 12c is preferably determined by a suitable motor speed determination unit 16b. This can e. g. be performed using the detected sensor signals received from the motor position sensor 12d. Based on the determined current speed, respective accelerations of the brushless DC motor 12c that are occurring during operation of the artificial force feel generating device 6 of FIG. 3 are preferably determined using a suitable motor acceleration determination unit 16c.

Based on the determined accelerations of the brushless DC motor 12c, inertia forces of the brushless DC motor 12c that are occurring during operation of the artificial force feel generating device 6 of FIG. 3 are preferably determined using a suitable motor inertia determination unit 16d. Furthermore, friction/damping forces of the brushless DC motor 12c that are occurring during operation of the artificial force feel generating device 6 are preferably determined using a suitable motor bearing friction/damping determination unit 16e.

In addition, a predefined conversion rate 16f of the reversible gear unit 12b must be considered. Furthermore, based on the determined accelerations of the brushless DC motor 12c, inertia forces of the reversible gear unit 12b that are occurring during operation of the artificial force feel generating device 6 of FIG. 3 are preferably determined using a suitable reversible gear unit inertia determination unit 16g. Moreover, friction forces of the reversible gear unit 12b that are occurring during operation of the artificial force feel generating device 6 are preferably determined using a suitable reversible gear unit friction determination unit 16h.

In summary, the shear pin loads 16i are determined on the basis of motor current and a corresponding torque created by the brushless DC motor 12c. Furthermore, inertia forces as well as friction/damping forces of the brushless DC motor 12c are considered. Moreover, a predefined conversion rate, inertia forces as well as friction forces of the reversible gear unit 12b are considered.

More generally, the shear pin loads 16i are determined based on the electrical motor current that is sensed by the suitable motor current sensor, as well as based on a correspondingly determined motor torque, taking into account motor torque constant tolerances, motor current sensor accuracy, variations of gearbox friction and bearing friction/damping due to wear, lubrication, and environment factors, such as e. g. temperature variations. Preferentially, also inertia effects, i. e. a respective contribution resulting from motor accelerations, are considered, which are derived from position sensor measurements, preferably by means of signals provided by a motor position sensor if accurate enough, otherwise by means of an output shaft position sensor. However, it should be noted that the determination of the respective shear pin loads based on the electrical motor current is only possible if there is no irreversible transmission, such as e. g. a worm screw or a trapezoidal screw, between the electrical motor and the shear pin.

FIG. 5 shows a rotary output actuator-deflection torque diagram 17 that exemplifies deflection-torque characteristics of the rotary output actuator 6b of FIG. 2 in operation, for illustrating a preferred functioning or operating method of the helicopter 1 of FIG. 1. More specifically, the deflection-torque characteristics illustrate an absolute torque 17b of the rotary output actuator 6b of FIG. 2 in operation dependent on a respective, momentary deflection 17c thereof. Furthermore, the deflection-torque characteristics are shown in the context of a maximum deflection 18a and a maximum torque 18b that can be induced into the rotary output actuator 6b of FIG. 2 in operation by the tactile cue actuator 12 of FIG. 2.

More specifically, the deflection-torque characteristics are composed of deflection-torque characteristics 17a that are based on tactile cue forces induced by the tactile cue actuator 12 of FIG. 2, as well as deflection-torque characteristics 17d that are based on nominal forces induced by the nominal force feel trim actuator 11 of FIG. 2. The deflection-torque characteristics 17d that are based on nominal forces induced by the nominal force feel trim actuator 11 of FIG. 2 define a nominal breakout torque 19a that is induced to the rotary output actuator 6b of FIG. 2 in operation in a predefined normal continuous function domain, wherein illustratively a detent 20c is occurring. In this predefined normal continuous function domain, pilot control forces that are required for deflecting the cyclic stick 4a of FIG. 1 are usually comparatively small.

Above this normal continuous function domain, i. e. above a first predefined deflection threshold value, a backdriving gradient ramp 20a is applied to the rotary output actuator 6b of FIG. 2 until a second predefined deflection threshold value is reached, which delimits a time limited function domain, wherein the tactile cue force provided by the tactile cue actuator 12 of FIG. 2 is only increased smoothly. In other words, as long as the induced tactile cue force, i. e. the induced absolute torque 17b, increases only smoothly, this stipulates to the pilot a normal functioning mode without undesirable, disadvantageous and/or dangerous flight and/or operating states, while still allowing a comparatively easy overriding.

Above the time limited function domain, a soft stop ramp 20b is generated such that starting from the second predefined deflection threshold value the induced tactile cue force, i. e. the induced absolute torque 17b increases abruptly, thereby stipulating to the pilot an approaching exiting of the normal functioning mode and an imminent entering of undesirable, disadvantageous and/or dangerous flight and/or operating states. However, overriding is still possible up to a certain extent, but the soft stop ramp 20b is preferably embodied such that the pilot feels a clear difference to the backdriving gradient ramp 20a, which should be perceived as a clear warning for stopping deflection of the cyclic stick 4a of FIG. 1. According to one aspect, the steepness and length of the backdriving gradient ramp 20a and the soft stop ramp 20b are adjustable.

Preferably, the soft stop ramp 20b is generated such that starting with a predefined third threshold value, an override function domain is reached. The override function domain is configured to stipulate to the pilot that undesirable, disadvantageous and/or dangerous flight and/or operating states have probably already been reached.

It should be noted that the above-described deflection-torque characteristics 17a, 17d are suitable in operation of the tactile cue actuator 12 of FIG. 2 as long as the shear pin 12a thereof is in a correct resp. healthy operation status, i. e. as long as a respectively determined current accumulated fatigue lies within predefined tolerances. If, however, the current accumulated fatigue exceeds a predetermined threshold, a pre-mature rupture of the shear pin 12a may occur if operation according to the above-described deflection-torque characteristics 17a, 17d is continued. Therefore, a re-configuration of the tactile cue actuator 12 of FIG. 2 is required.

According to one aspect, the re-configuration of the tactile cue actuator 12 of FIG. 2 is performed on the basis of the current accumulated fatigue and comprises reducing a maximum tactile cue force that is applicable by the tactile cue actuator 12 of FIG. 2 in operation on the rotary output actuator 6b of FIG. 2 and, thus, on the cyclic stick 4a of FIG. 1. Therefore, a respective maximum torque that is applicable by the tactile cue actuator 12 of FIG. 2 to the rotary output actuator 6b of FIG. 2 is preferably reduced, as indicated with an arrow 21a. Furthermore, re-configuring the tactile cue actuator 12 of FIG. 2 on the basis of the current accumulated fatigue may further comprise reducing the backdriving gradient ramp 20a that is applicable by the tactile cue actuator 12 of FIG. 2 in operation on the cyclic stick 4a of FIG. 1. Exemplarily, the backdriving gradient ramp 20a is re-configured into a re-configured backdriving gradient ramp 20d, as illustrated with an arrow 21b.

Figure 6:
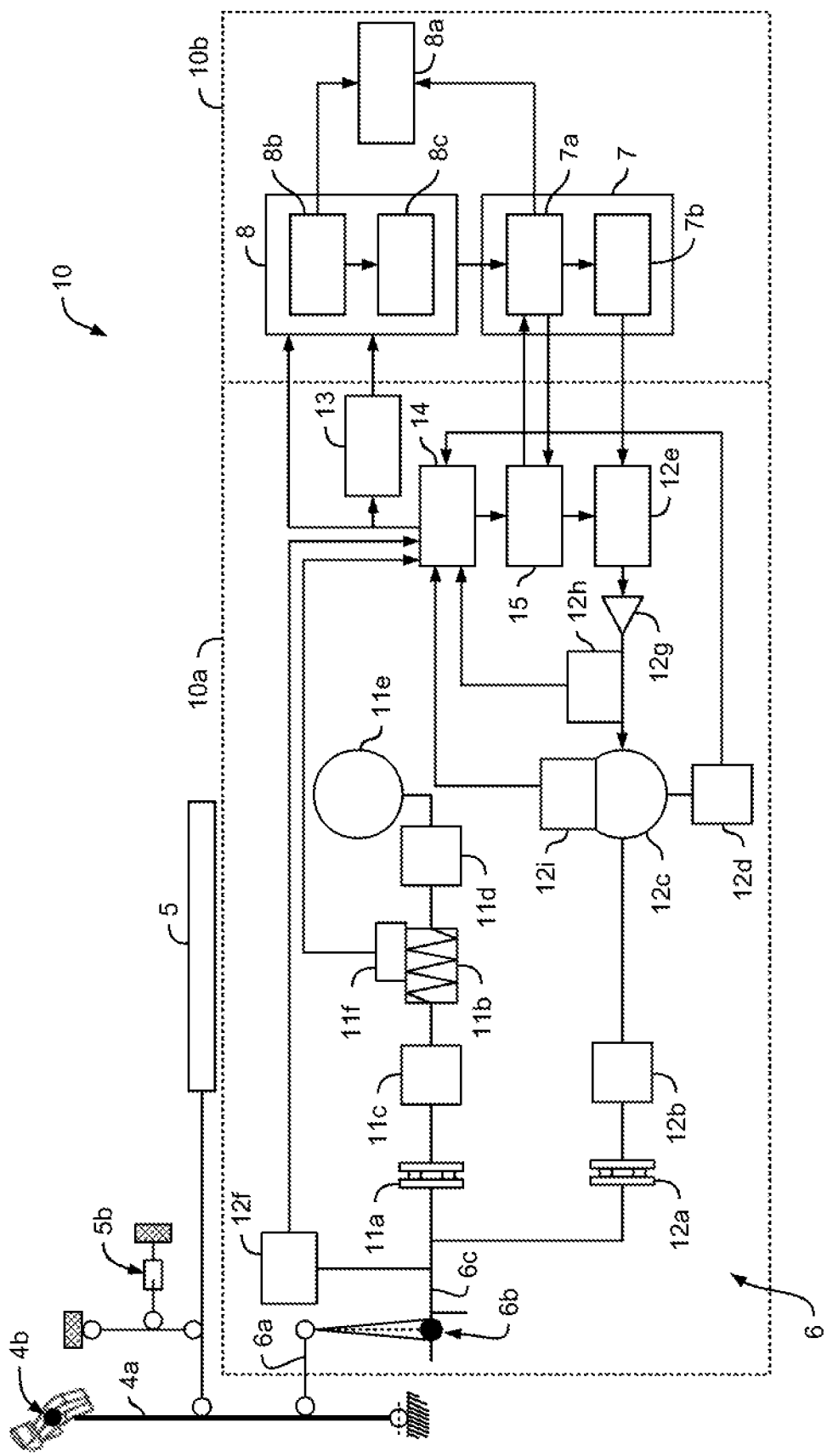
FIG. 6 shows a block diagram of the control system of FIG. 1 according to a second embodiment, which is connected via a mechanical linkage to an inceptor of the vehicle of FIG. 1.

FIG. 6 shows the vehicle control system 10 of FIG. 3 with the actuator-sided control system 10a and the vehicle-sided control system 10b. As described above with reference to FIG. 3, the actuator-sided control system 10a preferably comprises the artificial force feel generating device 6 of FIG. 3, which is again merely illustrated by means of its constituent components, while their allocation to the nominal force feel trim actuator 11 and the tactile cue actuator 12 of FIG. 2 is omitted, for simplicity and clarity of the drawings.

In contrast to FIG. 3, however, the vehicle control system 10 is now illustratively complemented with the cyclic stick 4a and the mechanical linkage 5 of FIG. 1. By way of example, the cyclic stick 4a is provided with a pilot interface that defines a grip reference point 4b and the mechanical linkage 5 is provided with an optional friction and damping unit 5b. Furthermore, the cyclic stick 4a is illustratively coupled to the rotary output actuator 6b via the mechanical connection 6a of FIG. 1.

Furthermore, also in contrast to FIG. 3, now a spring position sensor 11f is associated with the spring unit 11b of the nominal force feel trim actuator 11 of FIG. 2. Respectively detected sensor signals with respect to the spring unit 11b, i. e. a current spring position detected by means of the spring position sensor 11f, is preferably provided to the usage monitor 14 and processed by the later as described above at FIG. 3 with respect to the other detected sensor signals. In fact, by monitoring the current spring position, not only fatigue loads resulting from tactile cue forces created by means of the tactile cue actuator 12 of FIG. 2, but also fatigue loads resulting from nominal forces created by means of the nominal force feel trim actuator 11 of FIG. 2 can be detected.

Moreover, also in contrast to FIG. 3, the VMS 8 now comprises a usage monitor 8b and a predictor 8c. More specifically, fatigue of the cyclic stick 4a and/or the mechanical connection 6a resp. the mechanical linkage 5 can also be monitored. In fact, the mechanical connection 6a resp. the mechanical linkage 5 may also be subject to fatigue loads due to pilot control force inputs. Thus, by using the usage monitor 8b and the predictor 8c usage monitoring and fatigue load estimation can be performed with respect to the cyclic stick 4a and the mechanical connection 6a resp. the mechanical linkage 5 similar to what is described above with reference to FIGS. 3 to 5. In this case, corresponding monitor and trending tasks are preferably executed by the VMS 8 and, more specifically, by the usage monitor 8b and the predictor 8c, based on determined loads and control positions in order to calculate end stop limit cycles.

In a preferred embodiment, sufficiently detailed information for fatigue analysis concerning the mechanical design and material properties of the cyclic stick 4a, the mechanical linkage 5 and the mechanical connection 6a are not available to the tactile cue actuator 12 of FIG. 2, including the corresponding monitor 15 and predictor 13, but are only available to the VMS 8 including the usage monitor 8b and predictor 8c.

In addition to FIG. 3, the VMS 8 and especially the usage monitor 8b and predictor 8c that are part of the VMS 8 are able to instruct the protection configurator 7a and force feel command unit 7b on vehicle side that are part of the AFCS 7. If excessive fatigue of the mechanical flight controls 4a, 5 and 6a is monitored by the usage monitor 8b of the VMS 8, a re-configuration of respective flight envelope protections by the AFCS 7 and a corresponding re-configuration of the force feel command unit 7b by the AFCS 7 is preferably requested by the VMS 8 and the force feel will be re-configured accordingly by the force feel configurator 15 of the tactile cue actuator 12 of FIG. 2.

Figure 9:
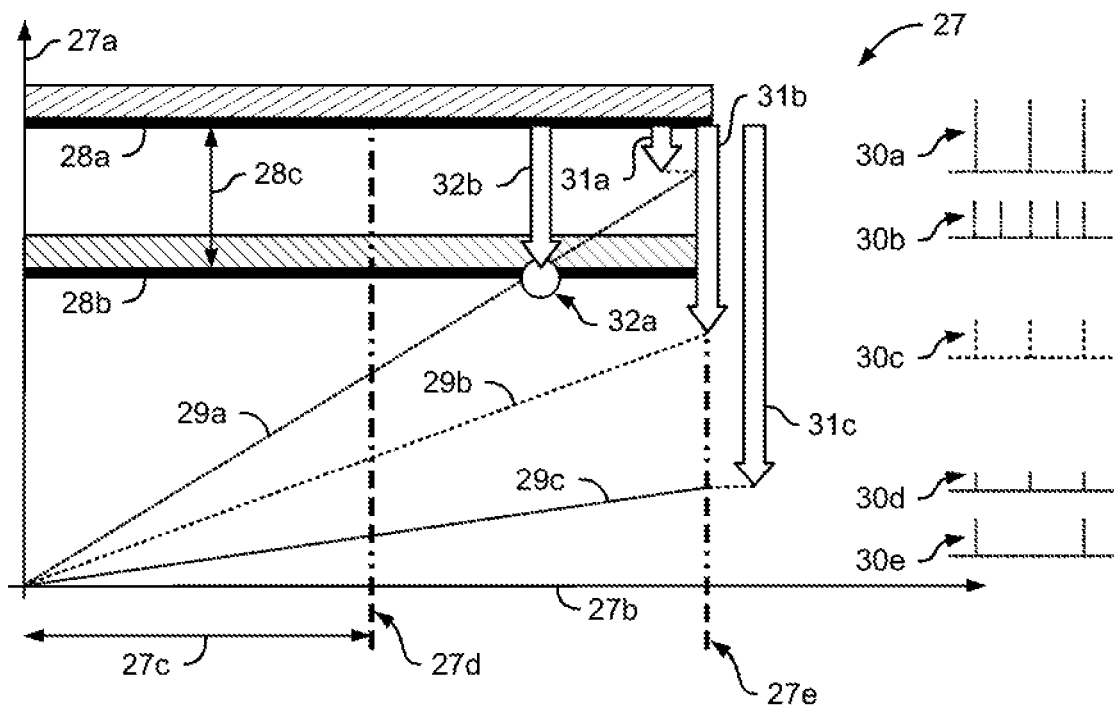
FIG. 9 shows an exemplary usage monitoring diagram according to an embodiment.

The same re-configuration preferably applies in a similar fashion if excessive fatigue of the mechanical flight controls 4a, 5 and 6a is predicted for the first and/or second regularly scheduled overhaul 27d and 27e (cp. e. g. FIG. 9) by the trending of the predictor 8c of the VMS 8.

In addition to FIG. 3, the force feel configurator 15 on actuator side informs the protection configurator 7a on vehicle management side of any re-configuration of force feel that are necessary on actuator side, so that flight envelope protections of the AFCS 7 and corresponding commanded force feel can be re-configured accordingly.

According to one aspect, the artificial force feel generating device 6 can now be controlled by:
monitoring usage of the cyclic stick 4a and the mechanical connection 6a during operation of the artificial force feel generating device 6,
determining a current accumulated fatigue of the cyclic stick 4a and/or the mechanical connection 6a on the basis of the monitored usage,
determining a fatigue prediction for the cyclic stick 4a and/or the mechanical connection 6a on the basis of the monitored usage and the current accumulated fatigue,
re-configuring protections of the AFCS 7 on the basis of the current accumulated fatigue,
re-configuring the tactile cue actuator 12 of FIG. 2 on the basis of the current accumulated fatigue, and
determining an applicable overhaul interval of the cyclic stick 4a and the mechanical connection 6a on the basis of the determined fatigue prediction.

Moreover, according to one aspect based on a currently sensed position of the output shaft 6c of the tactile cue actuator 12 of FIG. 2, which comprises the shear pin 12a, and a sensed position of the brushless DC motor 12c as described above with reference to FIG. 3, a current backlash is preferably determined by taking into account:
variations of backlash at the reversible gear unit 12b and bearing backlash at the brushless DC motor 12c occurring due to environmental parameters, such as e. g. temperature variations, and
wear of the shear pin 12a, which may be an indicator for rupture of the shear pin 12a in a near future.

An excessive current backlash corresponds to a loss of correlation between the motor position sensor 12d and a determined position of the output shaft 6c of the tactile cue actuator 12 of FIG. 2. Thus, in case of such an excessive backlash, the tactile cue actuator 12 of FIG. 2 is preferably reconfigured.

Figure 7:
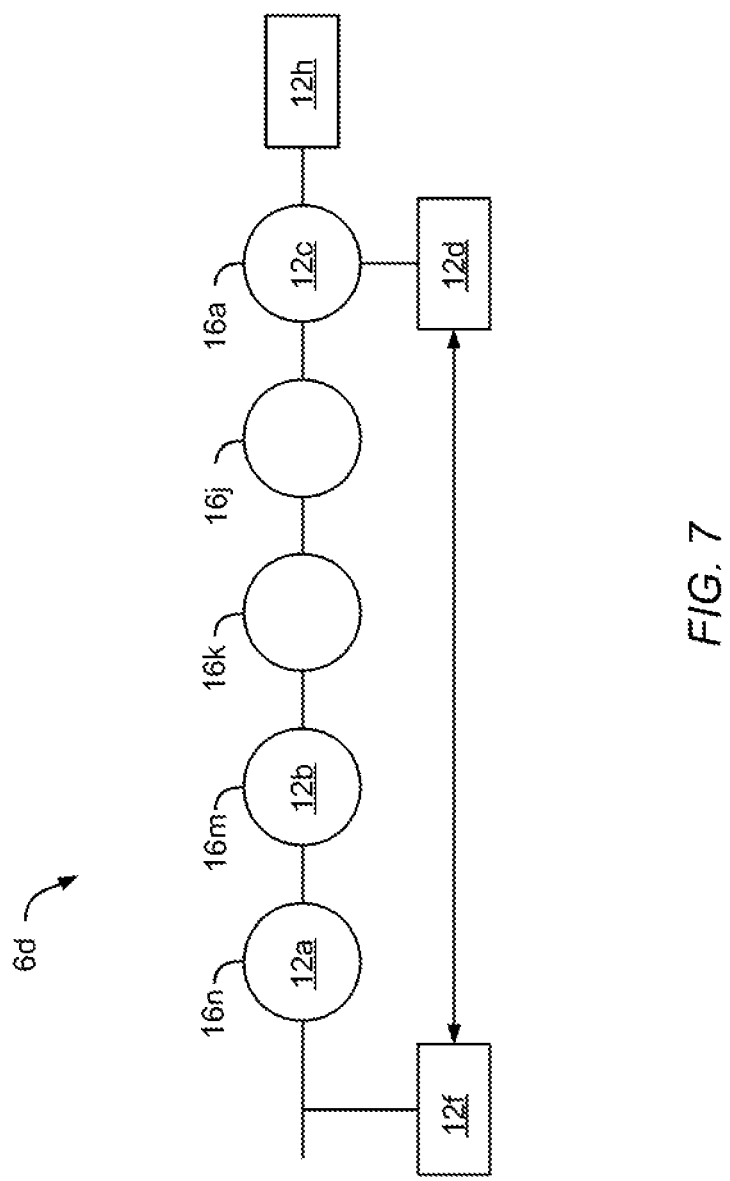
FIG. 7 shows a schematic view of a health monitoring and fatigue estimation procedure based on backlash according to a second embodiment.

FIG. 7 shows a fatigue and particularly health monitoring estimation procedure 6d executed by the usage monitor 14 of FIG. 3 or FIG. 6 for determining the health of the shear pin 12a FIG. 3 or FIG. 6 according to one aspect. More specifically, all components that must be considered when determining the current health of the shear pin 12a in terms of backlash are illustrated in FIG. 7. In particular, excessive backlash is considered as an indicator of excessive wear respectively fatigue of the shear pin 12a leading to premature rupture of the shear pin 12a.

The usage monitor 14 preferably determines backlash 16n of the shear pin 12a during operation of the artificial force feel generating device 6 of FIG. 3 or FIG. 6 for determining the health of the shear pin 12a. In a preferred embodiment, this is at least performed on the basis of the detected sensor signals received from the motor position sensor 12d and the tactile cue trim rotary output position sensor 12f. For this purpose, the relative motion between motor and output shaft is calculated and used to estimate the backlash 16n of the shear pin 12a.

According to one aspect, this is performed on the basis of the detected sensor signals received from the motor current sensor 12h, as well as on the basis of a corresponding torque created by the brushless DC motor 12c, which is determined by a suitable motor torque determination unit 16a of FIG. 4 and FIG. 7. Moreover, the deformation according to an underlying compliance 16j of drive train, comprising gear units, shafts and bearings, and supports is considered. In a preferred solution, the motor torque 16a is employed to determine the actual deformation due to compliance 16j according to FIG. 7.

According to one aspect, wear and corresponding backlash 16k of bearings and supports is taken into consideration. Furthermore, according to one aspect, wear and corresponding backlash 16m of the gearbox 12b is taken into consideration. Preferably, the temperature (not shown) of the motor, gearbox or environment is taken into consideration for the more precise estimation of the backlash of the gearbox.

More generally, the difference between the detected sensor signals received from the motor position sensor 12d and the tactile cue trim rotary output position sensor 12f is compared with the estimated deformation according to compliance 16j of drive train, estimated backlash of bearings and supports 16k and the estimated backlash 16m of the gearbox 12b in order to determine an estimation for the unknown backlash 16n of the shear pin 12a.

Figure 8:
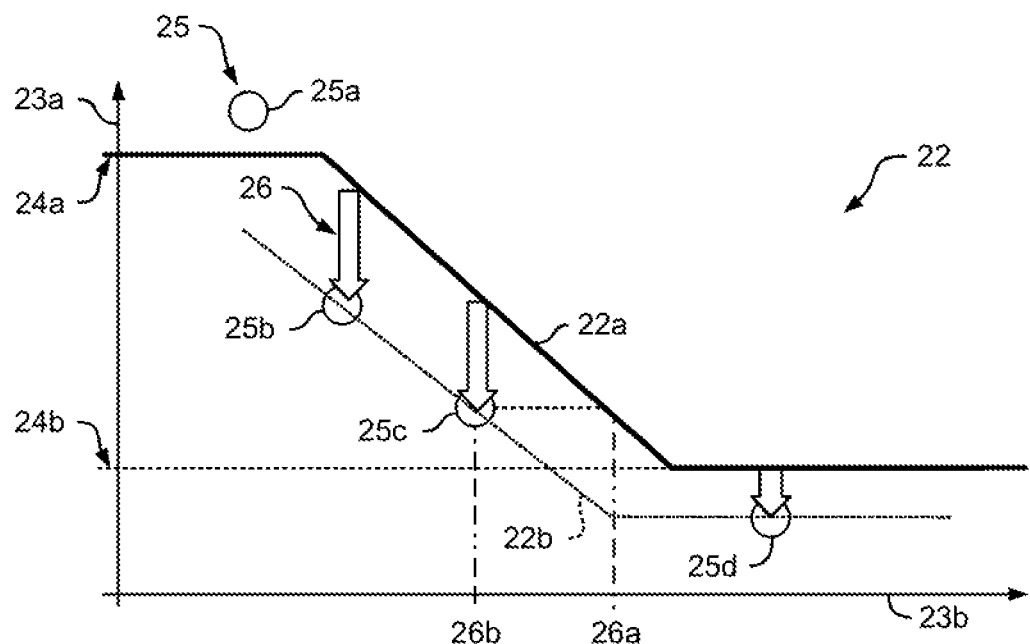
FIG. 8 shows an exemplary Wöhler diagram according to an embodiment.

FIG. 8 shows an exemplary Wöhler diagram 22 that is preferably used for determining the current accumulated fatigue of the shear pin 12a of FIG. 2, FIG. 3 and FIG. 6. The Wöhler diagram 22 shows an exemplary Wöhler curve 22a of a selected material that is preferably used for realizing the shear pin 12a. Furthermore, another exemplary Wöhler curve 22b of the selected material is shown, which includes an illustrative safety margin. More specifically, the Wöhler diagram 22 illustrates load levels 23a that are applicable to the shear pin 12a, which is realized with the selected material, dependent on a number of cycles 23b of application of the loads.

As can be seen from the Wöhler curve 22a, a static load level 24a defines a maximum load that can be applied to the shear pin 12a for a first number of cycles without leading to a rupture of the shear pin 12a. After that first number of cycles, a respectively applicable load decreases during a second number of cycles until an infinitely applicable load is reached, which defines an infinite load level 24b. More specifically, this infinite load level 24b represents a load that can be applied to the shear pin 12a for an indefinite number of cycles without leading to a rupture of the shear pin 12a.

The Wöhler diagram 22 further illustrates a multiplicity of different load cases 25 to which the shear pin 12a may be subjected in operation of the tactile cue actuator 12 of FIG. 2. More specifically, a first load case 25a exemplarily illustrates a load level of an intended disconnection of the tactile cue actuator 12 of FIG. 2, which usually occurs extremely remote. A second load case 25b exemplarily illustrates a load level of an intended override, where a pilot or co-pilot of the helicopter 1 of FIG. 1 intentionally overrides respective tactile cue forces supplied by the tactile cue actuator 12 of FIG. 2, which usually occurs rather rarely. A third load case 25c exemplarily illustrates a load level of an unintended "violation", where a pilot or co-pilot of the helicopter 1 of FIG. 1 unintentionally and only temporarily and slightly overrides respective tactile cue forces supplied by the tactile cue actuator 12 of FIG. 2, which usually occurs rather often. Finally, a fourth load case 25d exemplarily illustrates a load level of a so-called intended "riding the limit", where a pilot or co-pilot of the helicopter 1 of FIG. 1 operates very close or equals respective tactile cue forces supplied by the tactile cue actuator 12 of FIG. 2 without overriding them, which usually occurs very often.

It should be noted that the first load case 25a is clearly too extreme and leads to application of a load to the shear pin 12a that results in any case in rupture of the shear pin 12a. However, the second, third and fourth load cases 25b, 25c, 25d are such that the Wöhler curve 22b can be defined based on the load cases 25b, 25c, 25d. Thus, a preferable safety margin 26 can be incorporated into the Wöhler curve 22a, which is, therefore, re-configured into the Wöhler curve 22b.

In fact, the safety margin 26 can e. g. be recognized by comparing an actual point of fatigue failure of the shear pin 12a in the third load case with an assumed point of fatigue failure of the shear pin in the third load case. The actual point is labelled with the reference sign 26a and associated with the actual Wöhler curve 22a, while the assumed point is labelled with the reference sign 26b and associated with the re-configured Wöhler curve 22b. More specifically, the safety margin 26 corresponds to the number of cycles between the points 26a, 26b.

FIG. 9 shows a usage monitoring diagram 27 according to one aspect. The usage monitoring diagram 27 illustrates an accumulated fatigue 27a of the shear pin 12a of FIG. 2, FIG. 3 and FIG. 6, which is accumulated over a respective usage time 27b, and preferably determined on the basis of the Wöhler diagram 22 of FIG. 8. The usage monitoring diagram 27 further illustrates an exemplary overhaul time interval 27c that is predefined in order to establish overhaul points of time, on which regularly scheduled overhaul of at least the artificial force feel generating device 6 of FIG. 1 to FIG. 3 or FIG. 6 is performed. However, for simplicity and clarity only a first regularly scheduled overhaul point of time 27d and a second regularly scheduled overhaul point of time 27e are indicated.

More specifically, the usage monitoring diagram 27 illustrates an accumulated fatigue failure level 28a that leads according to the Wöhler diagram 22 of FIG. 8 to a failure, e. g. a rupture of the shear pin 12a of FIG. 2, FIG. 3 and FIG. 6. Furthermore, an accumulated fatigue trigger level 28b is indicated, which is spaced apart from the accumulated fatigue failure level 28a by a predefined acceptable safety margin 28c. The accumulated fatigue trigger level 28b represents a level, above which usually an extraordinary overhaul would be required in order to avoid e. g. a pre-mature rupture of the shear pin 12a of FIG. 2, FIG. 3 and FIG. 6.

Based on the Wöhler diagram 22 of FIG. 8, three accumulated fatigue graphs are determined: a first accumulated fatigue graph 29a for high loads acting on the shear pin 12a of FIG. 2, FIG. 3 and FIG. 6, a second accumulated fatigue graph 29b for nominal average loads acting on the shear pin 12a of FIG. 2, FIG. 3 and FIG. 6 and a third accumulated fatigue graph 29c for low loads acting on the shear pin 12a of FIG. 2, FIG. 3 and FIG. 6. More specifically, the first accumulated fatigue graph 29a is determined with respect to high amplitude loads 30a, i. e. loads that are applied with comparatively high or higher amplitudes, as well as with respect to more frequently applied loads 30b, i. e. loads that are applied comparatively often. The second accumulated fatigue graph 29b is determined with respect to nominal average loads 30c, i. e. loads that are applied with nominally average amplitudes. The third accumulated fatigue graph 29c is determined with respect to small amplitude loads 30d, i. e. loads that are applied with comparatively small or smaller amplitudes, as well as with respect to less frequently applied loads 30e, i. e. loads that are applied rather infrequently.

Illustratively, respective remaining safety margins at the second regularly scheduled overhaul point of time 27e are indicated for each one of the accumulated fatigue graphs 29a, 29b, 29c. Accordingly, first accumulated fatigue graph 29a has an associated remaining safety margin 31a, which is smaller than the predefined acceptable safety margin 28c. In contrast thereto, the second and third accumulated fatigue graphs 29b, 29c have respective associated remaining safety margins 31b, 31c, which are greater than the predefined acceptable safety margin 28c.

In fact, the first accumulated fatigue graph 29a reaches the accumulated fatigue trigger level 28b already at a point of time located approximately in the middle between the first regularly scheduled overhaul point of time 27d and the second regularly scheduled overhaul point of time 27e. This point of time is referred to with the reference sign 32a and corresponds to a point of time, where a remaining safety margin 32b of the first accumulated fatigue graph 29a equals the predefined acceptable safety margin 28c.

According to one aspect, the point of time 32a defines a point of time, where a re-configuration of the artificial force feel generating device 6 of FIG. 1 to FIG. 3 or FIG. 6 as described above is performed. Therefore, the point of time 32a is also referred to hereinafter as the "force feel re-configuration trigger point 32a". By re-configuring the artificial force feel generating device 6 of FIG. 1 to FIG. 3 or FIG. 6, loads that are applied to the shear pin 12a of FIG. 2, FIG. 3 and FIG. 6 in further operation are advantageously reduced such that the shear pin 12a of FIG. 2, FIG. 3 and FIG. 6 may at least be used safely and reliably until the second regularly scheduled overhaul point of time 27e, so that at least the above-mentioned extraordinary overhaul/unscheduled repair can be avoided.

However, as the safety margins 31b, 31c are sufficiently great, no action is required prior to the second regularly scheduled overhaul point of time 27e if usage of the shear pin 12a of FIG. 2, FIG. 3 and FIG. 6 is reflected by the second and third accumulated fatigue graphs 29b, 29c.

Figure 10:
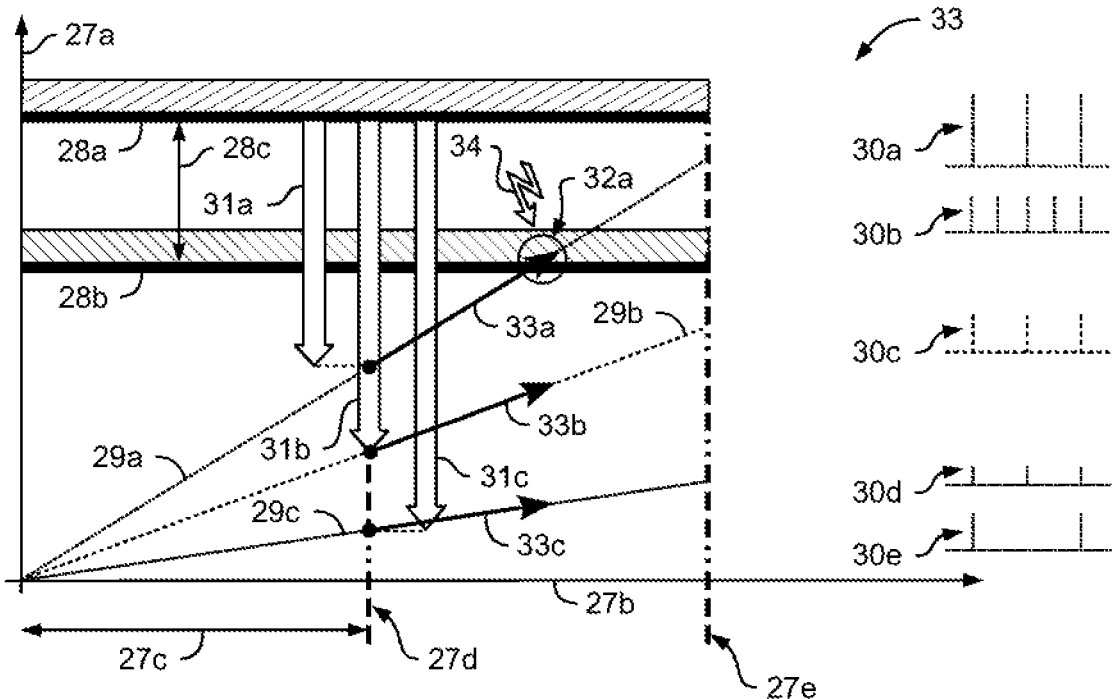
FIG. 10 shows an exemplary prediction diagram according to a first embodiment.

FIG. 10 shows a prediction diagram 33 that is according to one aspect determined on the basis of the usage monitoring diagram of FIG. 9. More specifically, the prediction diagram 33 essentially corresponds to the usage monitoring diagram 27, wherein however, in contrast to FIG. 9, the remaining associated safety margins 31a, 31b, 31c of the accumulated fatigue graphs 29a, 29b, 29c are determined at the first regularly scheduled overhaul point of time 27d. Thus, depending on monitored usage of the shear pin 12a of FIG. 2, FIG. 3 and FIG. 6 and starting at the first regularly scheduled overhaul point of time 27e, a usage prediction resp. a fatigue trend can be determined.

More specifically, if the monitored usage of the shear pin 12a of FIG. 2, FIG. 3 and FIG. 6 at the first regularly scheduled overhaul point of time 27e is represented by the first accumulated fatigue graph 29a, a corresponding high load prediction resp. high load fatigue trend 33a can be determined. If the monitored usage of the shear pin 12a of FIG. 2, FIG. 3 and FIG. 6 at the first regularly scheduled overhaul point of time 27e is, however, represented by the second accumulated fatigue graph 29b, a corresponding average load prediction resp. average load fatigue trend 33b can be determined and, if the monitored usage of the shear pin 12a of FIG. 2, FIG. 3 and FIG. 6 at the first regularly scheduled overhaul point of time 27e is represented by the third accumulated fatigue graph 29c, a corresponding low load prediction resp. low load fatigue trend 33c can be determined.

Illustratively, the high load prediction resp. high load fatigue trend 33a indicates that the force feel re-configuration trigger point 32a will be reached prior to the second regularly scheduled overhaul point of time 27e. Thus, if no re-configuration according to the present invention is carried out as described above, the need of an extraordinary overhaul, as illustratively indicated with reference sign 34, becomes necessary. As an alternative, overhaul can be initiated at the first regularly scheduled overhaul point of time 27d since the prediction 33a based on monitored usage corresponding to the first accumulated fatigue graph 29a indicates that the safety margin 28b will be reached at time 32a before reaching the second regularly scheduled overhaul point of time 27e. On the contrary, for the second and third accumulated fatigue graphs 29b and 29c no overhaul needs to be initiated at the first regularly scheduled overhaul point of time 27d because the corresponding predictions 33b and 33c still show sufficient margins 31b and 31c at the second regularly scheduled overhaul point of time 27e.

Figure 11:
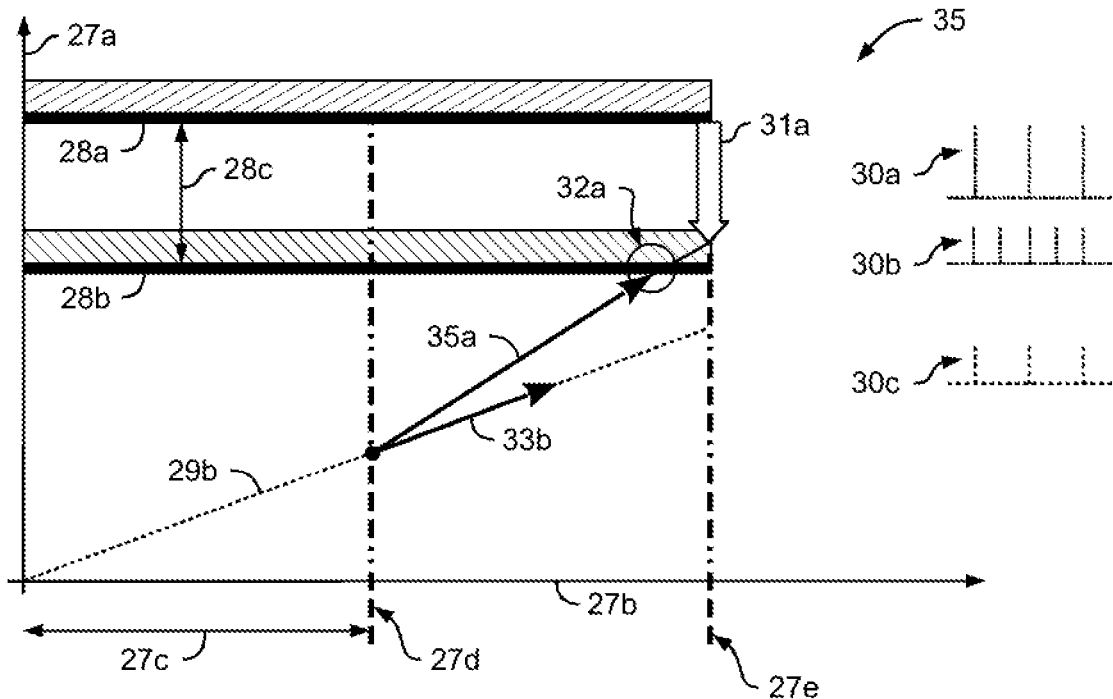
FIG. 11 shows an exemplary real life usage monitoring diagram according to an embodiment.

FIG. 11 shows an exemplary real life usage monitoring diagram 35 that is according to one aspect determined on the basis of the usage monitoring diagram 27 of FIG. 9. By way of example, the accumulated fatigue 27a of the shear pin 12a of FIG. 2, FIG. 3 and FIG. 6, which is accumulated over the respective usage time 27b, is illustrated in the form of an exemplary real life usage monitoring.

More specifically, it is assumed that an exemplary real life accumulated fatigue of the shear pin 12a of FIG. 2, FIG. 3 and FIG. 6 at the first regularly scheduled overhaul point of time 27d corresponds to the current accumulated fatigue that is represented by the second accumulated fatigue graph 29b of FIG. 9. Therefore, illustration of the first and third accumulated fatigue graphs 29a, 29c of FIG. 9 was omitted, for simplicity and clarity of the drawings.

If, starting at the first regularly scheduled overhaul point of time 27d, a respectively monitored usage of the shear pin 12a of FIG. 2, FIG. 3 and FIG. 6 continues to be represented by the second accumulated fatigue graph 29b, the average load prediction resp. average load fatigue trend 33b of FIG. 10 applies. Thus, a safe and reliable use of the shear pin 12a of FIG. 2, FIG. 3 and FIG. 6 until the second regularly scheduled overhaul point of time 27e can be assumed.

If, however, an unexpected more severe usage of the shear pin 12a of FIG. 2, FIG. 3 and FIG. 6 is monitored starting at the first regularly scheduled overhaul point of time 27d, as exemplarily indicated with an arrow 35a, the force feel re-configuration trigger point 32a may predictively again be reached prior to the second regularly scheduled overhaul point of time 27e. Therefore, re-configuration of the artificial force feel generating device 6 of FIG. 1 to FIG. 3 or FIG. 6 as described above is preferably performed such that the shear pin 12a of FIG. 2, FIG. 3 and FIG. 6 may at least be used safely and reliably until the second regularly scheduled overhaul point of time 27e, so that at least the above-mentioned extraordinary overhaul can be avoided.

Figure 12:
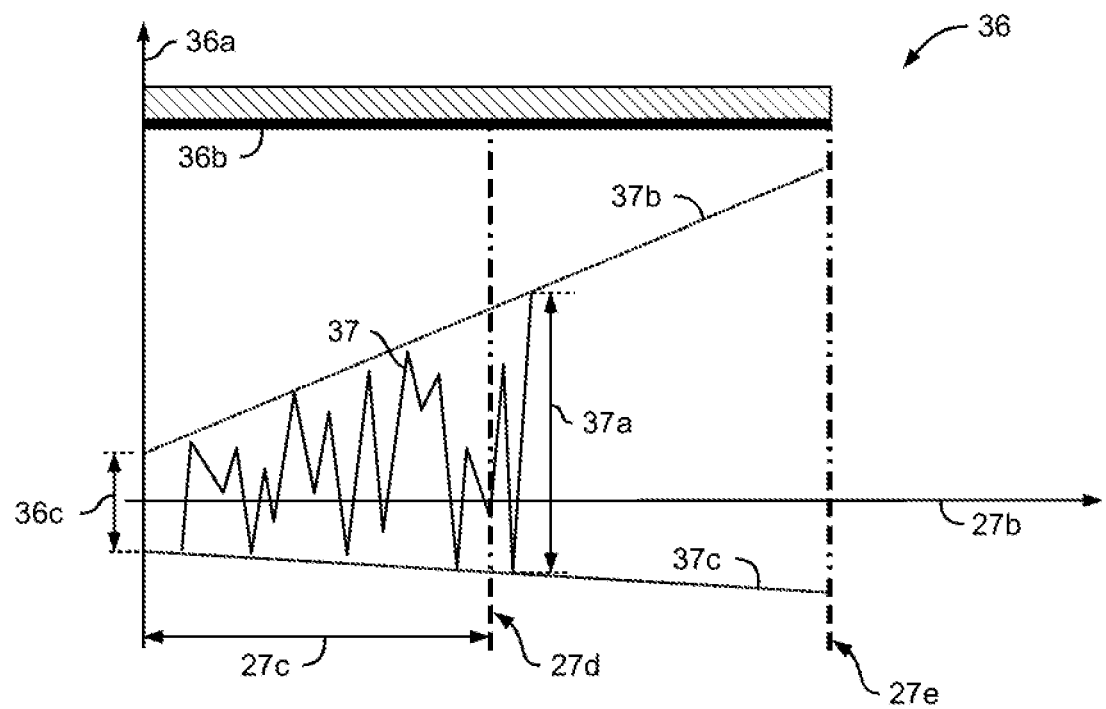
FIG. 12 shows an exemplary backlash health monitoring diagram according to an embodiment.

FIG. 12 shows a backlash health monitoring diagram 36 according to one aspect. The backlash health monitoring diagram 36 illustrates an observed backlash 36a of the shear pin 12a of FIG. 2, FIG. 3 and FIG. 6, which is accumulated over the respective usage time 27b of FIG. 9. The backlash health monitoring diagram 36 further illustrates the overhaul time interval 27c of FIG. 9 that is predefined in order to establish the first and second regularly scheduled overhaul points of time 27d, 27e of FIG. 9. The backlash health monitoring diagram 36 illustrates a maximum acceptable backlash level 36b that leads to a failure, e. g. a rupture of the shear pin 12a of FIG. 2, FIG. 3 and FIG. 6, as well as an initial backlash 36c, which is e. g. existing based on manufacturing and assembling tolerances of respectively used components.

More specifically, the backlash health monitoring diagram illustrates a backlash graph 37 that indicates a respectively currently observed backlash 37a between a motor position of the brushless DC motor 12c of FIG. 6, which is e. g. determined using the motor position sensor 12d of FIG. 6, and an actuator output shaft position of the output shaft 6c of FIG. 6, which is e. g. determined using the output shaft position sensor 12f of FIG. 6. The currently observed backlash 37a illustratively varies between a maximum difference 37b observed between the motor position of the brushless DC motor 12c of FIG. 6 and the actuator output shaft position of the output shaft 6c of FIG. 6, and a minimum difference 37c observed between the motor position of the brushless DC motor 12c of FIG. 6 and the actuator output shaft position of the output shaft 6c of FIG. 6. This variation is based on varying load conditions and/or environmental conditions that are acting on the shear pin 12a of FIG. 2, FIG. 3 and FIG. 6.

According to one aspect, if the currently observed backlash 37a equals the maximum acceptable backlash level 36b, a re-configuration of the artificial force feel generating device 6 of FIG. 1 to FIG. 3 or FIG. 6 as described above is performed in order to prevent pre-mature rupture of the shear pin.

Figure 13:
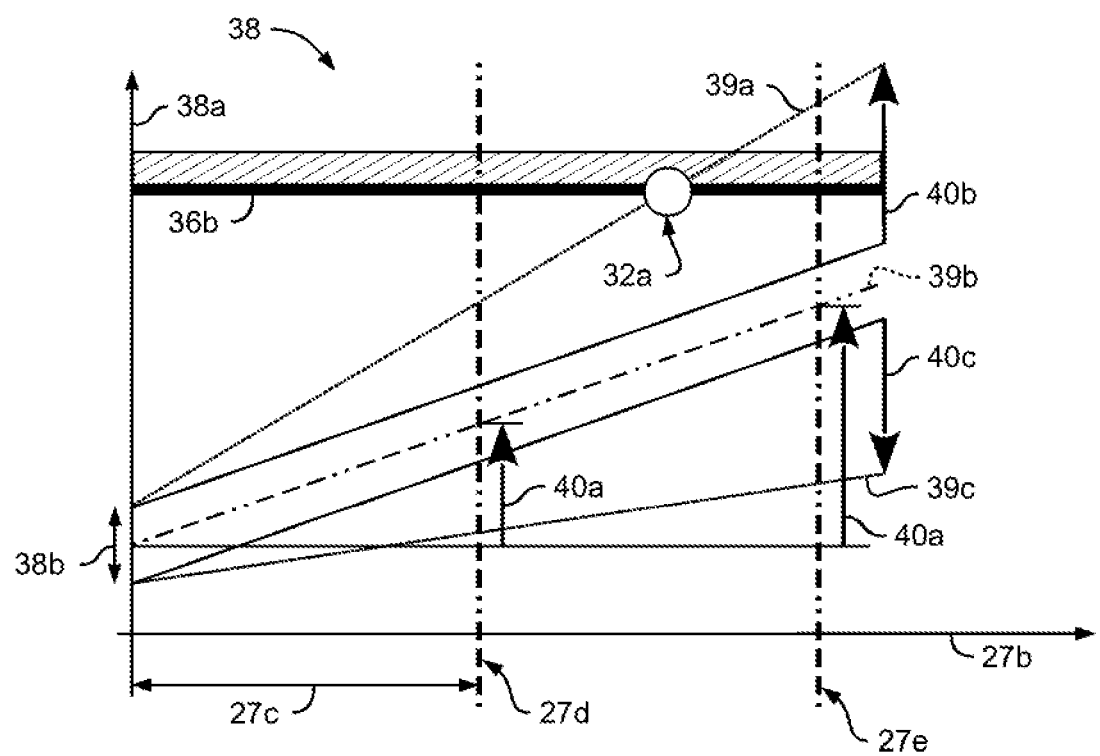
FIG. 13 shows an exemplary backlash increase monitoring diagram according to an embodiment.

FIG. 13 shows a backlash increase monitoring diagram 38 according to one aspect. The backlash increase monitoring diagram 38 illustrates an observed absolute backlash of the shear pin 12a of FIG. 2, FIG. 3 and FIG. 6, which is accumulated over the respective usage time 27b of FIG. 9. The backlash increase monitoring diagram 38 further illustrates the overhaul time interval 27c of FIG. 9 that is predefined in order to establish the first and second regularly scheduled overhaul points of time 27d, 27e of FIG. 9. Moreover, the maximum acceptable backlash level 36b of FIG. 12 as well as an initial backlash variation 38b, which is based on the initial backlash 36c of FIG. 12, is shown.

Three backlash graphs are determined: a first backlash graph 39a for high and/or frequent loads acting on the shear pin 12a of FIG. 2, FIG. 3 and FIG. 6, a second backlash graph 39b for nominal average loads and usage cycles acting on the shear pin 12a of FIG. 2, FIG. 3 and FIG. 6, and a third backlash graph 39c for low and/or less frequent loads acting on the shear pin 12a of FIG. 2, FIG. 3 and FIG. 6. The backlash graphs 39a, 39b, 39c are determined similar to what is described above with reference to FIG. 9.

However, it should be noted that the second backlash graph 39b is determined with a predefined uncertainty resulting from the initial backlash variation 38b. In other words, the second backlash graph 39b, which is illustrated by means of a dashed line, is determined with respect to nominal wear 40a that is detectable at the first and second regularly scheduled overhaul points of time 27d, 27e. However, this nominal wear 40a may vary due to the initial backlash variation 38b, so that the second backlash graph 39b may by closer to an upper or a lower nominal average load graph as illustrated with solid lines.

Illustratively, the first backlash graph 39a starts at the upper end of initial backlash variation 38b and differs from the second backlash graph 39b due to a wear increase 40b. The latter is e. g. based on additional wear due to a given uncertainty of operating cycles or occurring loads. Similarly, the third backlash graph 39c starts at the lower end of initial backlash variation 38b and differs from the second backlash graph 39b due to a wear decrease 40c. The latter is e. g. based on reduced wear due to a given uncertainty of operating cycles or occurring loads.

Similar to FIG. 9, the first backlash graph 39a reaches the force feel re-configuration trigger point 32a prior to the second regularly scheduled overhaul point of time 27e. Therefore, re-configuration of the artificial force feel generating device 6 of FIG. 1 to FIG. 3 or FIG. 6 as described above is preferably performed such that the shear pin 12a of FIG. 2, FIG. 3 and FIG. 6 may at least be used safely and reliably until the second regularly scheduled overhaul point of time 27e, so that at least the above-mentioned extraordinary overhaul can be avoided.

It should be noted that the backlash shown in FIG. 12 and FIG. 13 is determined from the measured position of the motor and the measured position of the output shaft according to the procedure shown in FIG. 7.

Figure 14:
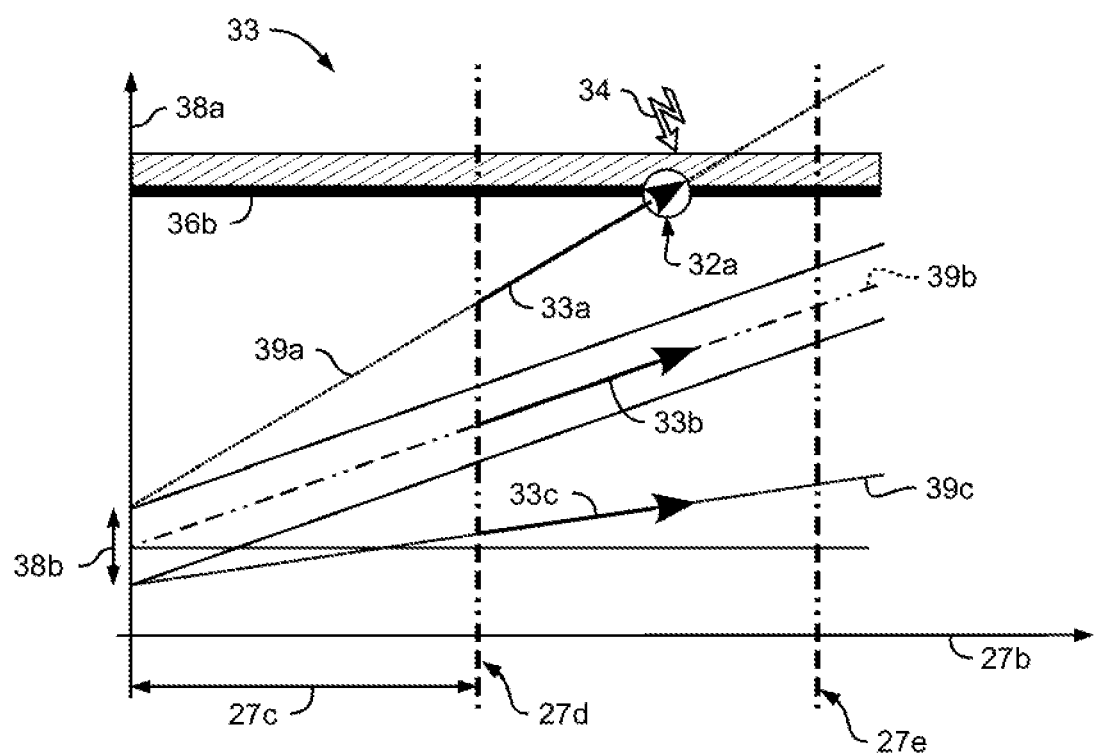
FIG. 14 shows an exemplary prediction diagram according to a first embodiment.

FIG. 14 shows the prediction diagram 33 of FIG. 10, which is now based on the backlash increase monitoring diagram 38 of FIG. 13 instead of being based on the usage monitoring diagram 27 of FIG. 9. According to one aspect, determination of respective backlash increase predictions resp. backlash increase trends is again possible, similar to what is explained above with reference to FIG. 10. Therefore, a more detailed explanation is omitted hereinafter, for brevity and conciseness.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention.

For instance, instead of performing usage monitoring and determination of predictions resp. trends with respect to accumulated fatigue of the shear pin 12a of FIG. 2, FIG. 3 and FIG. 6, a suitable health monitoring and trending may be performed. The health may be monitored by monitoring the accumulated fatigue and/or the backlash, as described above.

REFERENCE LIST 1 rotary wing aircraft
1a fuselage
1b tail boom
1c wheel-type landing gear
2 multi-blade main rotor
2a, 2b rotor blades 2c rotor head
2d rotor mast
3 tail rotor
4 main rotor pitch control unit
4a pilot inceptor
4b grip reference point
5 flight control kinematics resp. mechanical linkage
5a servo drive unit
5b optional friction and damping unit
6 artificial force feel generating device
6a mechanical connection
6b rotary output actuator
6c actuator output shaft
6d flight control kinematics usage monitoring and fatigue loads estimation procedure
7 automatic flight control system
7a protection configurator
7b force feel command unit
8 vehicle management system
8a multi-functional display
8b vehicle management system usage monitor
8c vehicle management system predictor
9a rotor mast bending moment sensor
9b weight-on-wheel sensors
10 control system
10a actuator control system
10b rotary wing aircraft control system
11 nominal force feel trim actuator
11a nominal force feel trim actuator safety device
11b spring unit
11c reversible gear unit
11d irreversible gear unit
11e brushed DC motor unit
11f spring position sensor
12 tactile cue actuator
12a tactile cue actuator safety device
12b reversible gear unit
12c brushless DC motor unit
12d motor position sensor
12e control and monitoring unit
12f tactile cue trim rotary output position sensor
12g tactile cue actuator power electronics
12h motor current sensor
12i motor temperature sensor
13 tactile cue actuator safety device predictor
14 tactile cue actuator safety device usage monitor
14a tactile cue actuator safety device usage monitoring and fatigue loads estimation procedure
15 force feel configurator
16a motor torque determination unit
16b motor speed determination unit
16c motor acceleration determination unit
16d motor inertia determination unit
16e motor bearing friction/damping determination unit
16f reversible gear unit conversion rate
16g reversible gear unit inertia determination unit
16h reversible gear unit friction determination unit
16i tactile cue actuator safety device load
16j compliance of drive train, including gearbox, bearings and supports
16k wear/backlash of bearings and supports
16m wear/backlash of gearbox
16n backlash of safety device/shear pin
17 rotary output actuator deflection-torque diagram
17a deflection-torque characteristics from tactile cue forces
17b rotary output actuator absolute torque
17c rotary output actuator deflection
17d deflection-torque characteristics from nominal forces
18a maximum rotary output actuator deflection
18b maximum rotary output actuator torque
19a nominal rotary output actuator breakout torque
20a backdriving gradient ramp
20b soft stop ramp
20c detent
20d reconfigured backdriving gradient ramp
21a maximum rotary output actuator torque re-configuration
21b backdriving gradient ramp re-configuration
22 tactile cue actuator safety device Wöhler diagram
22a Wöhler curve of tactile cue actuator safety device material
22b Wöhler curve of tactile cue actuator safety device material including safety margin
23a load levels applicable to tactile cue actuator safety device
23b number of cycles
24a static load level
24b infinite life level
25 possibly occurring load cases
25a intended disconnect load
25b intended override load
25c unintended "violation" load
25d intended "riding the limit" load
26 safety margin
26a actual point of fatigue failure due to unintended "violation" load
26b assumed point of fatigue failure due to unintended "violation" load with applied safety margin
27 usage monitoring diagram
27a accumulated tactile cue actuator safety device fatigue
27b tactile cue actuator safety device usage time
27c overhaul time interval
27d first regularly scheduled overhaul
27e second regularly scheduled overhaul
28a actual accumulated fatigue leading to tactile cue actuator safety device failure
28b accumulated fatigue trigger level
28c acceptable safety margin
29a accumulated fatigue graph for high loads
29b accumulated fatigue graph for nominal average loads
29c accumulated fatigue graph for low loads
30a high amplitude loads
30b more frequently applied loads
30c nominal applied loads
30d small amplitude loads
30e less frequently applied loads
31a reduced safety margin
31b nominal safety margin
31c increased safety margin
32a force feel re-configuration trigger point
32b remaining safety margin
33 prediction diagram
33a determined high load prediction
33b determined average load prediction
33c determined low load prediction
34 overhaul triggering
35 exemplary real life usage monitoring diagram
35a unexpected more severe usage
36 backlash health monitoring diagram
36a observed backlash
36b maximum backlash
36c initial backlash
37 backlash graph of backlash between observed brushless DC motor unit position and observed actuator output shaft position 37a current backlash
37b maximum difference between observed brushless DC motor unit position and observed actuator output shaft position
37c minimum difference between observed brushless DC motor unit position and observed actuator output shaft position
38 backlash increase monitoring diagram
38a absolute backlash
38b initial backlash variation
39a backlash graph for high loads
39b backlash graph for nominal average loads
39c backlash graph for low loads
40a nominal wear
40b wear increase
40c wear reduction

What is claimed is:

1. A method of controlling an artificial force feel generating device for generation of an artificial feeling of force on an inceptor of a vehicle control system, the inceptor being adapted for controlling a servo-assisted control unit of the vehicle control system via associated flight control kinematics, wherein the artificial force feel generating device comprises at least one force generating device that is mechanically connected to the inceptor for generating a tactile cue force acting in operation on the inceptor, and wherein a safety device is provided for limiting authority of the at least one force generating device, the method comprising at least the steps of:
monitoring usage of the safety device during operation of the artificial force feel generating device,
determining a current accumulated fatigue of the safety device on the basis of the monitored usage, and
re-configuring the at least one force generating device on the basis of the current accumulated fatigue.

2. The method of claim 1, wherein the step of re-configuring the at least one force generating device on the basis of the current accumulated fatigue comprises reducing a maximum tactile cue force that is applicable by the at least one force generating device in operation on the inceptor.

3. The method of claim 1, further comprising the step of determining, at least on the basis of the monitored usage and/or the current accumulated fatigue, a fatigue prediction for the safety device.

4. The method of claim 3, further comprising the step of determining, on the basis of the monitored usage and/or the determined fatigue prediction, an applicable overhaul interval of the safety device.

5. The method of claim 4, wherein the at least one force generating device is mechanically connected to the inceptor via an output shaft and comprises a motor unit that is adapted for creating torque on the output shaft, the torque defining the tactile cue force acting in operation on the inceptor, and wherein the step of monitoring usage of the safety device during operation of the artificial force feel generating device comprises monitoring the torque created by the motor unit.

6. The method of claim 5, wherein the at least one force generating device comprises at least one sensor element associated with the motor unit, wherein the step of monitoring usage of the safety device during operation of the artificial force feel generating device comprises using the at least one sensor element for detecting an operating parameter of the motor unit, and determining the torque created by the motor unit on the basis of the detected operating parameter.

7. The method of claim 6, wherein the at least one sensor element comprises a motor current sensor, and wherein the detected operating parameter is a motor current of the motor unit.

8. The method of claim 7, wherein the step of re-configuring the at least one force generating device on the basis of the current accumulated fatigue comprises decreasing the motor current for reducing the torque created by the motor unit.

9. The method of claim 1, wherein the safety device comprises a shear pin, and wherein the step of re-configuring the at least one force generating device on the basis of the current accumulated fatigue comprises reducing a maximum tactile cue force that is applicable by the at least one force generating device in operation on the inceptor such that a premature fatigue rupture of the shear pin is prevented.

10. The method of claim 9, wherein the step of monitoring usage of the safety device during operation of the artificial force feel generating device comprises determining shear pin loads acting on the shear pin during operation of the artificial force feel generating device.

11. The method of claim 10, wherein the at least one force generating device is mechanically connected to the inceptor via an output shaft and comprises a motor unit and a reversible gear unit that is operated by the motor unit, the motor unit being adapted for creating torque on the output shaft, wherein the torque defines the tactile cue force acting in operation on the inceptor, and wherein determining shear pin loads acting on the shear pin comprises:
determining the torque created by the motor unit, motor speed and/or motor accelerations of the motor unit occurring during operation of the artificial force feel generating device,
determining inertia forces and/or friction/damping forces of the motor unit occurring during operation of the artificial force feel generating device, and
determining inertia forces and/or friction forces of the reversible gear unit occurring during operation of the artificial force feel generating device.

12. The method of claim 1, further comprising the step of monitoring health of the safety device during operation of the artificial force feel generating device, wherein the step of re-configuring the at least one force generating device is based on the monitored health of the safety device.

13. The method of claim 12, further comprising the steps of:
determining, at least on the basis of a trend of a current monitored health of the safety device, a health prediction for the safety device, and
determining, on the basis of the determined health prediction, an applicable overhaul interval of the safety device.

14. The method of claim 13, wherein the safety device comprises a shear pin and wherein the step of monitoring health of the safety device during operation of the artificial force feel generating device comprises determining backlash of the shear pin based on motor position sensor and tactile cue trim rotary output position sensor taking into account motor torque estimated based on motor current sensor, drive train and support compliance, gearbox wear, bearing and support wear.

15. A method of controlling an artificial force feel generating device for generation of an artificial feeling of force on an inceptor of a vehicle control system that comprises an automatic flight control system, the inceptor being adapted for controlling a servo-assisted control unit of the vehicle control system via associated flight control kinematics, wherein the artificial force feel generating device comprises at least one force generating device that is mechanically connected to the inceptor via a mechanical connection for generating a tactile cue force acting in operation on the inceptor, the method comprising at least the steps of:

monitoring usage of the inceptor and the mechanical connection during operation of the artificial force feel generating device, determining a current accumulated fatigue of the inceptor and/or the mechanical connection on the basis of the monitored usage, determining a fatigue prediction for the inceptor and/or the mechanical connection on the basis of the current accumulated fatigue, re-configuring protections of the automatic flight control system on the basis of the current accumulated fatigue, re-configuring the at least one force generating device on the basis of the current accumulated fatigue, and determining an applicable overhaul interval of the inceptor and a mechanical linkage on the basis of the determined fatigue prediction.

\* \* \* \* \*